US011941929B2

(12) United States Patent
Morris et al.

(10) Patent No.: US 11,941,929 B2

**(45) Date of Patent: *Mar. 26, 2024**

(54) SYSTEM FOR FACILITATING ACCESS TO A SECURED AREA

(71) Applicant: The Chamberlain Group LLC, Oak Brook, IL (US)

(72) Inventors: David R. Morris, Glenview, IL (US); James Scott Murray, West Chicago, IL (US); Robert J. Olmsted, Wood Dale, IL (US)

(73) Assignee: THE CHAMBERLAIN GROUP LLC, Oak Brook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/104,689

(22) Filed: Feb. 1, 2023

(65) Prior Publication Data

US 2023/0177899 A1 Jun. 8, 2023

Related U.S. Application Data

(63) Continuation of application No. 16/912,104, filed on Jun. 25, 2020, now Pat. No. 11,574,512, which is a (Continued)

(51) Int. Cl.

*G07C 9/00* (2020.01)
*E05F 15/668* (2015.01)
*E05F 15/77* (2015.01)

(52) U.S. Cl.

CPC ........ *G07C 9/00309* (2013.01); *E05F 15/668* (2015.01); *E05F 15/77* (2015.01); (Continued)

(58) Field of Classification Search

None

See application file for complete search history.

(56) References Cited

U.S. PATENT DOCUMENTS 4,881,148 A * 11/1989 Lambropoulos ... G07C 9/00817 361/182
5,285,205 A 2/1994 White
(Continued)

FOREIGN PATENT DOCUMENTS

AT 501039 5/2006
AT 008482 8/2006
(Continued)

OTHER PUBLICATIONS

"Assa Abloy trials remote hotel check-ins", @ 2012 AOL Inc., [online]. Retrieved from the Internet: <URL: http://www.engadget.com/2010/11 /02/assa-abloy-trials-remote-hotel-check-ins-unlocking-your-room-wi/>, (Accessed Apr. 23, 2012), 2 pgs.
(Continued)

*Primary Examiner* — Muhammad Adnan

(74) *Attorney, Agent, or Firm* — Dority & Manning, P.A.

(57) ABSTRACT

A movable barrier operator comprising a motor, communication circuitry configured to receive a control signal and communicate with a door lock associated with a passageway door, and a controller. The controller is configured to authenticate the control signal, wherein authenticating the control signal includes associating the signal with a first level of access or a second level of access. The controller is further configured to communicate with the door lock via the communication circuitry to permit opening of the passageway door in response to associating the control signal with the first level of access and inhibit opening of the passageway door in response to associating the control signal with the second level of access. The controller is configured to cause the motor to open the movable barrier regardless of association of the control signal with the first level of access or the second level of access.

29 Claims, 9 Drawing Sheets

Related U.S. Application Data continuation of application No. 16/050,923, filed on Jul. 31, 2018, now Pat. No. 10,713,869.

(60) Provisional application No. 62/659,535, filed on Apr. 18, 2018, provisional application No. 62/540,047, filed on Aug. 1, 2017.

(52) U.S. Cl.
CPC ...... *G07C 9/00896* (2013.01); *E05Y 2201/22* (2013.01); *E05Y 2400/81* (2013.01); *E05Y 2400/814* (2013.01); *E05Y 2400/818* (2013.01); *E05Y 2900/106* (2013.01); *G07C 2009/00928* (2013.01)

(56) References Cited

U.S. PATENT DOCUMENTS 5,428,388 A 6/1995 von Bauer
5,506,905 A * 4/1996 Markowski ........... H04L 9/3242 713/168
5,751,224 A * 5/1998 Fitzgibbon ......... G07C 9/00182 318/16
5,767,784 A * 6/1998 Khamharn ......... G07C 9/00182 340/5.23
5,774,053 A * 6/1998 Porter ..................... F25D 23/10 340/568.1
5,872,513 A 2/1999 Fitzgibbon
5,910,163 A 6/1999 Schlamp
5,987,892 A 11/1999 Watanabe
6,037,858 A 3/2000 Seki
6,046,680 A * 4/2000 Soenen ................. G08C 19/28 340/5.31
6,049,598 A 4/2000 Peters
6,085,172 A 7/2000 Junger
6,134,593 A 10/2000 Alexander
6,140,938 A 10/2000 Flick
6,204,763 B1 3/2001 Sone
6,292,575 B1 9/2001 Bortolussi
6,300,873 B1 10/2001 Kucharczyk
6,323,782 B1 11/2001 Stephens
6,344,796 B1 2/2002 Ogilvie
6,404,337 B1 6/2002 Van Till et al.
6,414,587 B1 * 7/2002 Fitzgibbon ......... G07C 9/00182 340/5.71
6,466,261 B1 10/2002 Nakamura
6,483,433 B2 11/2002 Moskowitz
6,529,949 B1 3/2003 Getsin
6,536,659 B1 3/2003 Hauser
6,563,431 B1 * 5/2003 Miller, Jr. ............... E04H 6/426 340/5.71
6,570,488 B2 5/2003 Kucharczyk
6,574,455 B2 6/2003 Jakobsson
6,611,205 B2 8/2003 Guthrie
6,696,918 B2 2/2004 Kucharczyk
6,748,295 B2 6/2004 Tilles
6,778,064 B1 8/2004 Yamasaki
6,778,084 B2 8/2004 Chang
6,793,253 B2 9/2004 Bruwer
6,853,853 B1 2/2005 Van Wiemeersch
6,882,269 B2 4/2005 Moreno
6,909,356 B2 6/2005 Brown
6,950,725 B2 9/2005 von Kannewurff
6,952,181 B2 10/2005 Karr
6,957,197 B1 10/2005 Altendahl
6,965,294 B1 11/2005 Elliott
6,967,562 B2 11/2005 Menard
6,967,575 B1 11/2005 Dohrmann
6,975,937 B1 12/2005 Kantarjiev
6,987,452 B2 1/2006 Yang
7,015,943 B2 3/2006 Chiang
7,015,946 B2 3/2006 Suzuki
7,028,339 B2 4/2006 Stevens
7,035,916 B1 4/2006 Backman
7,042,492 B2 5/2006 Spinelli
7,076,449 B2 7/2006 Tsunenari
7,120,697 B2 10/2006 Aiken, Jr.
7,133,743 B2 11/2006 Tilles
7,149,959 B1 12/2006 Jones
7,151,434 B2 12/2006 Mayer
7,154,531 B2 12/2006 Laird
7,158,941 B1 1/2007 Thompson
7,170,998 B2 1/2007 McLintock
7,193,644 B2 3/2007 Carter
7,205,908 B2 4/2007 Tsui
7,207,142 B2 4/2007 Mullet
7,212,889 B2 5/2007 Mann
7,237,013 B2 6/2007 Winkeler
7,242,279 B2 7/2007 Wolfe
7,260,835 B2 8/2007 Bajikar
7,269,634 B2 9/2007 Getsin
7,345,574 B2 3/2008 Fitzgibbon
7,353,042 B2 4/2008 Yamagishi
7,355,505 B2 4/2008 Bonner
7,376,572 B2 5/2008 Siegel
7,379,805 B2 5/2008 Olsen, III
7,385,499 B2 6/2008 Horton
7,429,910 B2 * 9/2008 Domenz ................. E05F 15/77 340/5.23
7,441,264 B2 10/2008 Himmel
7,468,663 B1 12/2008 Rufolo, Jr.
7,468,676 B2 12/2008 Styers
7,471,189 B2 12/2008 Vastad
7,484,088 B2 1/2009 Campbell
7,518,485 B2 4/2009 Shuster
7,528,722 B2 5/2009 Nelson
7,532,709 B2 5/2009 Styers
7,553,173 B2 6/2009 Kowalick
7,558,743 B2 7/2009 Razumov
7,567,844 B2 7/2009 Thomas
7,583,191 B2 9/2009 Zinser
7,602,283 B2 10/2009 John
7,647,231 B2 1/2010 Kuebert
7,653,603 B1 1/2010 Holtkamp, Jr.
7,657,466 B2 2/2010 Klingenberg
7,677,243 B2 3/2010 McClendon
7,697,686 B2 4/2010 Puiatti
7,729,957 B2 6/2010 Sadler
7,735,732 B2 6/2010 Linton
7,742,928 B2 6/2010 Reynolds
7,746,223 B2 6/2010 Howarter
7,765,131 B2 7/2010 Klingenberg
7,786,891 B2 8/2010 Owens
7,788,221 B2 8/2010 Tanaka
7,792,712 B2 9/2010 Kantarjiev
7,815,112 B2 10/2010 Volpe
7,817,013 B2 10/2010 Bazakos
7,847,675 B1 12/2010 Thyen
7,869,582 B2 1/2011 Styers
7,885,821 B2 2/2011 Tait
7,904,391 B2 3/2011 Sesek
7,940,300 B2 5/2011 Spinelli
7,945,032 B2 5/2011 Elberbaum
7,962,422 B1 6/2011 Melechko
7,983,991 B2 7/2011 Crussol
8,018,329 B2 9/2011 Morgan
8,044,782 B2 10/2011 Saban
8,045,961 B2 10/2011 Ayed
8,054,340 B2 11/2011 Miki
8,077,034 B2 12/2011 Borlez
8,077,054 B1 12/2011 Aarons
8,093,986 B2 1/2012 Harvey
8,103,521 B2 1/2012 Kuebert
8,108,259 B2 1/2012 Klingenberg
8,108,914 B2 1/2012 Hernoud
8,120,459 B2 2/2012 Kwak
8,139,098 B2 3/2012 Carter
8,140,592 B2 3/2012 Scott
8,144,183 B2 3/2012 Carter
8,144,184 B2 3/2012 Carter
8,154,581 B2 4/2012 Carter
8,164,614 B2 4/2012 Carter
8,218,739 B2 7/2012 Styers

(56) References Cited

U.S. PATENT DOCUMENTS 8,255,235 B2 8/2012 Aldstadt
8,265,947 B2 9/2012 Kuebert
8,326,001 B2 12/2012 Free
8,334,906 B2 12/2012 Lipton
8,378,988 B1 2/2013 Artino
8,410,930 B2 4/2013 Karasek
8,487,998 B2 7/2013 Chen
8,489,520 B2 7/2013 Kuebert
8,558,885 B2 10/2013 Fitzgibbon
8,558,887 B2 10/2013 Plaster
8,624,733 B2 1/2014 Cusack, Jr.
8,635,078 B2 1/2014 Aldstadt
8,666,907 B1 3/2014 Wang
8,675,066 B2 3/2014 Trundle
8,700,474 B2 4/2014 Argue
8,704,793 B1 4/2014 Artino
8,731,953 B2 5/2014 Cook
8,733,291 B2 5/2014 Dunigan
8,767,075 B2 7/2014 Bianco
8,769,632 B2 7/2014 Cook
8,775,329 B2 7/2014 Kuebert
8,780,201 B1 7/2014 Scalisi
D714,514 S 9/2014 Pettit
8,823,795 B1 9/2014 Scalisi
8,825,021 B2 9/2014 Wang
8,825,535 B2 9/2014 Weik, III
8,831,225 B2 9/2014 Gilb
8,842,180 B1 9/2014 Kasmir
8,844,010 B2 9/2014 Brady
8,844,811 B1 9/2014 Rogers
8,872,915 B1 10/2014 Scalisi
8,876,050 B2 * 11/2014 Wentland .............. B64C 1/1407
244/129.4
8,881,252 B2 11/2014 Van Till
8,896,446 B2 11/2014 Cusack, Jr.
8,897,433 B2 11/2014 Mota
8,919,637 B2 12/2014 Kim
8,934,679 B2 1/2015 Jeon
8,941,736 B1 1/2015 Scalisi
8,947,530 B1 2/2015 Scalisi
8,976,025 B2 3/2015 Somasundaram
8,976,248 B2 3/2015 Tanaka
8,990,889 B2 3/2015 Van Till
9,003,196 B2 4/2015 Hoyos
9,013,575 B2 4/2015 Scalisi
9,053,622 B2 6/2015 Scalisi
9,055,202 B1 6/2015 Scalisi
9,058,738 B1 6/2015 Scalisi
9,060,103 B2 6/2015 Scalisi
9,060,104 B2 6/2015 Scalisi
9,065,987 B2 * 6/2015 Kasmir ............... H04M 1/0291
9,068,375 B2 6/2015 Hinkel
9,109,378 B2 8/2015 Scalisi
9,118,819 B1 8/2015 Scalisi
9,122,254 B2 9/2015 Cate
9,147,117 B1 9/2015 Madhu
9,160,987 B1 10/2015 Kasmir
9,164,614 B2 10/2015 Irie
9,165,444 B2 10/2015 Scalisi
9,179,058 B1 11/2015 Zeira
9,179,109 B1 11/2015 Kasmir
9,195,950 B2 11/2015 Schenken
9,196,133 B2 11/2015 Scalisi
9,202,034 B2 12/2015 Matsuoka
9,208,629 B2 * 12/2015 Saladin .............. G07C 9/00896
9,229,957 B2 1/2016 Kwan
9,230,158 B1 1/2016 Ramaswamy
9,230,230 B2 1/2016 Gupta
9,235,943 B2 1/2016 Scalisi
9,244,147 B1 1/2016 Soundararajan
9,245,398 B2 1/2016 Plummer
9,275,535 B1 3/2016 Ho
9,322,194 B2 4/2016 Cheng
9,322,201 B1 4/2016 Cheng
9,325,949 B2 4/2016 Moriarty
9,326,094 B2 4/2016 Johnson
9,350,918 B1 5/2016 Baldwin
9,359,794 B2 6/2016 Cheng
9,364,112 B2 6/2016 Sundaresan
9,382,739 B1 7/2016 Johnson
9,392,099 B2 7/2016 Lim
9,396,594 B1 7/2016 Fujisaki
9,414,030 B2 8/2016 Carter
9,418,350 B2 8/2016 Matula
9,426,432 B2 8/2016 Scalisi
9,426,720 B2 8/2016 Cohn
9,447,609 B2 9/2016 Johnson
9,453,758 B2 9/2016 Motoyama
9,459,772 B2 10/2016 Nihal
9,460,596 B1 10/2016 Moses
9,461,992 B2 10/2016 Outwater
9,467,656 B1 10/2016 Leizerovich
9,470,017 B1 10/2016 Cheng
9,470,018 B1 10/2016 Cheng
9,472,031 B2 10/2016 Pouille
9,472,032 B2 10/2016 Litterer
9,472,077 B2 10/2016 Coviello
9,473,636 B2 10/2016 Lenzeder
9,483,887 B1 11/2016 Soleimani
9,485,478 B2 11/2016 Carter
9,508,054 B2 11/2016 Brady
9,510,693 B2 12/2016 Cordier
9,514,584 B1 12/2016 Burge
9,514,586 B2 12/2016 Rogers
9,516,030 B2 12/2016 Torgersrud
9,516,284 B2 12/2016 Carter
9,530,262 B2 12/2016 Johnson
9,530,295 B2 12/2016 Johnson
9,536,216 B1 1/2017 Lisso
9,554,090 B1 1/2017 Carter
9,558,673 B2 1/2017 Soundararajan
9,563,904 B2 2/2017 Mastierov
9,563,915 B2 2/2017 Brady
9,584,336 B2 2/2017 Dunn
9,608,834 B2 3/2017 Hall
9,619,955 B2 4/2017 Eichenblatt
9,635,323 B2 4/2017 Carter
9,641,474 B2 5/2017 Brady
9,644,399 B2 5/2017 Johnson
9,647,996 B2 5/2017 Johnson
9,648,290 B2 5/2017 Carter
9,652,912 B2 5/2017 Fadell
9,652,913 B2 5/2017 Drako
9,652,917 B2 5/2017 Johnson
9,654,614 B1 5/2017 Hall
9,661,122 B1 5/2017 Hall
9,661,123 B1 5/2017 Hall
9,667,768 B1 5/2017 Hall
9,683,391 B2 6/2017 Johnson
9,692,738 B1 6/2017 Wenneman
9,697,548 B1 7/2017 Jaff
9,704,320 B2 7/2017 Johnson
9,706,178 B2 7/2017 Carter
9,712,335 B2 7/2017 Hall
9,727,328 B2 8/2017 Johnson
9,747,735 B1 8/2017 Drako
9,756,233 B2 9/2017 Lee
9,760,072 B2 9/2017 Hall
9,779,571 B2 10/2017 Chong
9,786,141 B2 * 10/2017 Grabham ............. G08B 25/008
9,798,999 B2 10/2017 Schenken
9,799,183 B2 10/2017 Harrison
9,811,798 B2 11/2017 Lievens
9,811,958 B1 * 11/2017 Hall ......................... G07C 9/28
9,835,434 B1 * 12/2017 Sloo .................... H04L 12/2807
9,846,902 B2 12/2017 Brady
9,861,221 B2 1/2018 Jiang
9,875,486 B2 1/2018 Mastierov
9,881,474 B2 1/2018 Fadell
9,892,384 B2 2/2018 Mastierov
9,898,711 B2 2/2018 Neal
9,916,557 B1 3/2018 Gillen
9,916,746 B2 3/2018 Johnson
9,922,513 B1 3/2018 Hall

(56) References Cited

U.S. PATENT DOCUMENTS 9,928,749 B2 3/2018 Gil
9,953,388 B2 4/2018 Jones
9,977,547 B1 * 5/2018 Sloo ........................ G06K 19/08
10,015,898 B2 * 7/2018 Whitmire .............. E05F 15/668
10,039,401 B1 8/2018 Romanucci
10,055,718 B2 8/2018 Madura
10,089,801 B1 * 10/2018 Musabeyoglu ....... G06F 21/335
10,089,809 B1 * 10/2018 Daly .................. G07C 9/00174
10,096,189 B2 * 10/2018 Siegesmund ......... F16B 7/0413
10,137,816 B2 11/2018 Harper
10,147,249 B1 * 12/2018 Brady ................ G07C 9/00571
10,167,661 B2 * 1/2019 Preus ...................... E05F 15/77
10,203,211 B1 * 2/2019 Mishra ............... G01C 21/3602
10,222,119 B2 3/2019 Rezayat
10,255,737 B1 4/2019 Eichenblatt
10,300,157 B2 5/2019 Jones
D850,865 S 6/2019 Smith
10,332,383 B1 * 6/2019 Giles .................... G08B 25/008
10,373,226 B1 * 8/2019 Russell .............. G06Q 30/0635
10,382,608 B2 * 8/2019 Gerhardt ............... H04W 12/50
10,388,092 B1 * 8/2019 Solh ......................... G07C 9/37
D860,789 S 9/2019 Rayeski
10,443,918 B2 10/2019 Li
10,467,835 B2 11/2019 Jones
10,488,081 B2 11/2019 High
10,515,335 B2 12/2019 Winkle
10,525,865 B2 1/2020 Wilkinson
10,540,632 B2 1/2020 Putcha
10,540,884 B1 * 1/2020 Lyman ................. G08B 15/002
10,600,100 B2 3/2020 Mattingly
10,602,867 B2 3/2020 Poss
10,604,254 B2 3/2020 O'Brien
10,618,447 B2 4/2020 Putcha
10,621,811 B2 4/2020 Tovey
10,624,484 B1 4/2020 Mountford
10,627,244 B1 * 4/2020 Lauka ................ G01C 21/3623
10,628,786 B2 4/2020 Millhouse
10,643,170 B2 5/2020 Lee
10,657,383 B1 * 5/2020 Solh ................... G07C 9/00182
10,713,869 B2 * 7/2020 Morris .................... E05F 15/77
10,772,450 B2 9/2020 Waisanen
10,834,523 B1 11/2020 Rao
10,860,115 B1 12/2020 Tran
10,874,240 B2 12/2020 Lewis
10,977,660 B2 4/2021 Thomas
11,037,146 B2 6/2021 Payne
11,055,942 B2 7/2021 Coates
11,087,602 B2 8/2021 Lark
11,151,679 B2 10/2021 Millhouse
11,157,865 B2 10/2021 Millhouse
11,166,580 B2 11/2021 Waisanen
11,275,196 B2 3/2022 Bratton
11,521,444 B1 * 12/2022 Badik ................ G07C 9/00912
11,562,610 B2 1/2023 Alamin
11,574,512 B2 2/2023 Morris
2001/0013762 A1 8/2001 Roman
2001/0024094 A1 9/2001 Fitzgibbon
2001/0024095 A1 9/2001 Fitzgibbon
2001/0029483 A1 10/2001 Schultz
2001/0037509 A1 11/2001 Kligman
2001/0038272 A1 11/2001 Fitzgibbon
2001/0040422 A1 * 11/2001 Gramlich ................ G07F 17/13 340/532
2001/0045449 A1 11/2001 Shannon
2002/0013744 A1 1/2002 Tsunenari
2002/0014953 A1 2/2002 Stephens
2002/0014954 A1 2/2002 Fitzgibbon
2002/0032572 A1 3/2002 Ikemori
2002/0032612 A1 3/2002 Williams
2002/0033683 A1 3/2002 Fitzgibbon
2002/0034319 A1 3/2002 Tumey
2002/0035515 A1 3/2002 Moreno
2002/0035857 A1 3/2002 Stein
2002/0050147 A1 5/2002 Mai
2002/0053975 A1 * 5/2002 Fitzgibbon ......... G07C 9/00182 340/541
2002/0065565 A1 5/2002 Okamura
2002/0087375 A1 7/2002 Griffin
2002/0087429 A1 * 7/2002 Shuster ................... G07F 17/13 340/5.73
2002/0088854 A1 * 7/2002 Jo .......................... G06Q 10/08 235/385
2002/0097145 A1 7/2002 Tumey
2002/0099945 A1 * 7/2002 McLintock .............. G07C 9/27 713/186
2002/0103653 A1 8/2002 Huxter
2002/0103724 A1 8/2002 Huxter
2002/0110242 A1 8/2002 Bruwer
2002/0147919 A1 10/2002 Gentry
2002/0152390 A1 10/2002 Furuyama
2002/0153854 A1 10/2002 Reed
2002/0156645 A1 10/2002 Hansen
2002/0177460 A1 11/2002 Beasley
2002/0180580 A1 12/2002 Gotfried
2002/0180582 A1 12/2002 Nielsen
2002/0186130 A1 12/2002 Guthrie
2003/0007851 A1 1/2003 Heigl
2003/0029579 A1 2/2003 Mays
2003/0037009 A1 2/2003 Tobin
2003/0071590 A1 4/2003 Roman
2003/0076062 A1 4/2003 Mullet
2003/0083807 A1 * 5/2003 Kuroda .............. G01C 21/3685 701/468
2003/0114206 A1 * 6/2003 Timothy ............... G06F 3/0233 455/12.1
2003/0155488 A1 8/2003 Olson
2003/0169337 A1 9/2003 Wilson
2003/0205980 A1 11/2003 Fitzgibbon
2003/0234719 A1 * 12/2003 Denison ............. G07C 9/00309 340/5.23
2004/0012483 A1 1/2004 Mays
2004/0015393 A1 1/2004 Fong
2004/0057567 A1 3/2004 Lee
2004/0066328 A1 4/2004 Galley
2004/0122780 A1 * 6/2004 Devar ...................... G07C 9/21 705/405
2004/0133446 A1 7/2004 Myrick
2004/0164847 A1 8/2004 Hale
2004/0168083 A1 8/2004 Gasparini
2004/0177279 A1 * 9/2004 Domenz ............ G07C 9/00817 340/5.52
2004/0210327 A1 10/2004 Robb
2004/0216379 A1 11/2004 Gioia
2004/0252017 A1 12/2004 Holding
2005/0006908 A1 1/2005 Bruwer
2005/0007451 A1 1/2005 Chiang
2005/0060063 A1 3/2005 Reichelt
2005/0080898 A1 4/2005 Block
2005/0104716 A1 5/2005 Simms
2005/0131774 A1 6/2005 Huxter
2005/0137990 A1 6/2005 Mayer
2005/0140321 A1 6/2005 Wojciak, Jr.
2005/0149741 A1 7/2005 Humbel
2005/0172462 A1 8/2005 Rudduck
2005/0173937 A1 8/2005 Yoshida
2005/0174080 A1 8/2005 Beckerman
2005/0176400 A1 8/2005 Mullet
2005/0199019 A1 9/2005 Marcelle
2005/0204787 A1 9/2005 Ernst
2005/0206498 A1 9/2005 Tsui
2005/0206519 A1 9/2005 Tsui
2005/0207616 A1 * 9/2005 Brad ........................ G01V 8/12 382/103
2005/0218854 A1 10/2005 Gioia
2005/0232747 A1 10/2005 Brackmann
2006/0012325 A1 1/2006 Robb
2006/0055511 A1 3/2006 Rodriguez
2006/0058012 A1 3/2006 Caspi
2006/0170533 A1 8/2006 Chioiu
2006/0176016 A1 8/2006 Kok
2006/0186844 A1 8/2006 Fitzgibbon
2006/0186991 A1 8/2006 Jankovsky

(56) References Cited

U.S. PATENT DOCUMENTS

2006/0190419 A1 8/2006 Bunn
2006/0197481 A1 9/2006 Hotto
2006/0202815 A1 9/2006 Thomas
2006/0254729 A1 11/2006 Mays
2006/0255912 A1 11/2006 Simms
2006/0282277 A1 12/2006 Ng
2007/0005452 A1 1/2007 Klingenberg
2007/0008142 A1* 1/2007 Crowe .................. A45C 11/32 340/572.8
2007/0022438 A1 1/2007 Arseneau
2007/0024421 A1 2/2007 Hale
2007/0046231 A1 3/2007 Mullet
2007/0046232 A1 3/2007 Mullet
2007/0150375 A1 6/2007 Yang
2007/0172155 A1 7/2007 Guckenberger
2007/0188120 A1 8/2007 Mullet
2007/0193834 A1 8/2007 Pai
2007/0268145 A1 11/2007 Bazakos
2007/0268365 A1 11/2007 Lee
2007/0285510 A1 12/2007 Lipton
2008/0012515 A1 1/2008 Murray
2008/0061926 A1* 3/2008 Strait ................. G07C 9/00309 340/5.71
2008/0061957 A1 3/2008 Nguyen
2008/0072170 A1 3/2008 Simons
2008/0087797 A1 4/2008 Turnbull
2008/0088410 A1 4/2008 Mullet
2008/0094175 A1 4/2008 Mullet
2008/0121682 A1 5/2008 Grim
2008/0133209 A1 6/2008 Bar-Or
2008/0136628 A1 6/2008 Ishii
2008/0168271 A1 7/2008 Sherburne
2008/0215766 A1 9/2008 Stobbe
2008/0224859 A1 9/2008 Li
2008/0239072 A1 10/2008 Cheng
2008/0247345 A1 10/2008 Bahar
2008/0298230 A1 12/2008 Luft
2009/0012802 A1 1/2009 Pinney
2009/0037217 A1 2/2009 Naik
2009/0041311 A1 2/2009 Hundley
2009/0051528 A1* 2/2009 Graichen ................. G07C 9/38 340/545.2
2009/0059001 A1 3/2009 Wang
2009/0115570 A1 5/2009 Cusack, Jr.
2009/0166403 A1* 7/2009 Volpe ................. G07C 9/00912 235/375
2009/0209829 A1* 8/2009 Yanagidaira ........... A61B 5/165 600/509
2009/0231093 A1 9/2009 Keller, Jr.
2009/0231121 A1 9/2009 Daniel-Wayman
2009/0231427 A1 9/2009 Fitzgibbon
2009/0251560 A1 10/2009 Azar
2009/0278683 A1 11/2009 Carter
2009/0284595 A1 11/2009 Carter
2010/0045429 A1 2/2010 Mullet
2010/0075655 A1 3/2010 Howarter
2010/0100497 A1 4/2010 Kuebert
2010/0141381 A1 6/2010 Bliding
2010/0171588 A1 7/2010 Chutorash
2010/0176919 A1 7/2010 Myers
2010/0190480 A1 7/2010 Zheng
2010/0201536 A1 8/2010 Robertson
2010/0237984 A1 9/2010 Zenaty
2010/0250021 A1* 9/2010 Cook .................... G07C 5/008 701/1
2010/0250929 A1 9/2010 Schultz
2010/0283560 A1 11/2010 Sommer
2010/0283580 A1 11/2010 Sheng
2010/0289661 A1 11/2010 Styers
2010/0306549 A1 12/2010 Ullmann
2011/0000140 A1 1/2011 Mays
2011/0007156 A1 1/2011 Sankaranarayanan
2011/0013812 A1 1/2011 Shin
2011/0060480 A1 3/2011 Mottla
2011/0074570 A1 3/2011 Feldstein
2011/0106329 A1 5/2011 Donnelly
2011/0162058 A1 6/2011 Powell
2011/0165896 A1 7/2011 Stromberg
2011/0166700 A1 7/2011 Dunn
2011/0187497 A1 8/2011 Chin
2011/0193700 A1 8/2011 Fitzgibbon
2011/0205014 A1* 8/2011 Fitzgibbon ......... G07C 9/00857 340/5.6
2011/0227712 A1 9/2011 Atteck
2011/0228083 A1 9/2011 Su
2011/0231914 A1 9/2011 Hung
2011/0252843 A1 10/2011 Sumcad
2011/0254680 A1 10/2011 Perkinson
2011/0254681 A1 10/2011 Perkinson
2011/0254955 A1 10/2011 Shen
2011/0282611 A1 11/2011 Reed
2011/0292214 A1 12/2011 Plaster
2011/0311052 A1 12/2011 Myers
2011/0317872 A1 12/2011 Free
2012/0005297 A1 1/2012 Robles Gil Daellenbach
2012/0007735 A1 1/2012 Rhyins
2012/0019659 A1 1/2012 Warzelhan
2012/0027268 A1 2/2012 Kwan
2012/0036141 A1 2/2012 Kim
2012/0050006 A1 3/2012 Deblaey
2012/0089532 A1 4/2012 Kuebert
2012/0092124 A1* 4/2012 Fitzgibbon ............. H04B 1/713 340/5.1
2012/0092125 A1* 4/2012 Farber ................... E05F 15/668 340/5.7
2012/0113253 A1 5/2012 Slater
2012/0126939 A1 5/2012 Chang
2012/0147179 A1 6/2012 Kim
2012/0169880 A1 7/2012 Williamson
2012/0174143 A1 7/2012 Yang
2012/0188346 A1 7/2012 Schnabl
2012/0249289 A1 10/2012 Freese
2012/0280783 A1* 11/2012 Gerhardt ................. H04L 63/08 340/5.6
2012/0280789 A1 11/2012 Gerhardt
2012/0280790 A1 11/2012 Gerhardt
2012/0288023 A1 11/2012 Karabinis
2013/0006885 A1 1/2013 Kuebert
2013/0024525 A1 1/2013 Brady
2013/0024924 A1 1/2013 Brady
2013/0027212 A1* 1/2013 King .................. G07C 9/00182 340/635
2013/0066744 A1 3/2013 Higgins
2013/0100230 A1 4/2013 Carter
2013/0114188 A1 5/2013 Fitzgibbon
2013/0147601 A1 6/2013 Fitzgibbon
2013/0147623 A1 6/2013 Somasundaram
2013/0163833 A1 6/2013 Wang
2013/0167212 A1 6/2013 Azar
2013/0169801 A1 7/2013 Martin
2013/0176437 A1 7/2013 Tseng
2013/0204803 A1 8/2013 Chalmers
2013/0223696 A1 8/2013 Azar
2013/0227886 A1 9/2013 Kurth
2013/0262276 A1 10/2013 Wan
2013/0271261 A1 10/2013 Ribas
2013/0275326 A1 10/2013 Klingenberg
2013/0297047 A1 11/2013 Sullivan
2013/0300866 A1 11/2013 Kildevaeld, III
2013/0314542 A1 11/2013 Jackson
2013/0328663 A1* 12/2013 Ordaz .................. G05B 19/042 340/5.62
2014/0009609 A1 1/2014 Webster
2014/0014008 A1 1/2014 Tompkins
2014/0015978 A1 1/2014 Smith
2014/0016837 A1 1/2014 Nechyba
2014/0020635 A1 1/2014 Sayers
2014/0037155 A1 2/2014 De Oliveira
2014/0049371 A1 2/2014 Tung
2014/0063191 A1 3/2014 Bataller
2014/0075528 A1 3/2014 Matsuoka
2014/0077927 A1 3/2014 Mattern
2014/0078303 A1 3/2014 Mattern

(56) References Cited

U.S. PATENT DOCUMENTS

2014/0098227 A1 4/2014 Chen
2014/0104429 A1 4/2014 Ward
2014/0125499 A1 5/2014 Cate
2014/0129606 A1 5/2014 Cate
2014/0139316 A1 5/2014 Fitzgibbon
2014/0139678 A1 5/2014 Moriarty
2014/0180959 A1* 6/2014 Gillen ..................... G01S 19/14 705/341
2014/0192197 A1 7/2014 Hanko
2014/0195952 A1 7/2014 Champagne
2014/0225713 A1* 8/2014 McIntyre et al. ..... H04W 48/04 340/5.61
2014/0247347 A1 9/2014 McNeill
2014/0254896 A1 9/2014 Zhou
2014/0266573 A1* 9/2014 Sullivan ............. G07C 9/00571 340/4.32
2014/0266589 A1* 9/2014 Wilder ............... G07C 9/00817 340/5.64
2014/0266593 A1 9/2014 Nye
2014/0267716 A1 9/2014 Child
2014/0293046 A1 10/2014 Ni
2014/0334684 A1 11/2014 Strimling
2014/0341443 A1 11/2014 Cao
2014/0358814 A1 12/2014 Brady
2014/0361869 A1 12/2014 Prasad
2014/0365773 A1 12/2014 Gerhardt
2014/0368646 A1 12/2014 Traff
2015/0028165 A1 1/2015 Deng
2015/0029008 A1 1/2015 Scalisi
2015/0029334 A1 1/2015 Scalisi
2015/0049191 A1 2/2015 Scalisi
2015/0062337 A1 3/2015 Scalisi
2015/0062343 A1 3/2015 Hwang
2015/0077219 A1 3/2015 Keller, Jr.
2015/0084779 A1 3/2015 Saladin
2015/0088781 A1 3/2015 Gillen
2015/0097949 A1 4/2015 Ure
2015/0100513 A1 4/2015 Parris
2015/0102906 A1 4/2015 Gerhardt
2015/0120015 A1 4/2015 Fadell
2015/0138353 A1 5/2015 Yang
2015/0145643 A1* 5/2015 Fadell .................. G08B 29/185 340/5.51
2015/0145993 A1 5/2015 Scalisi
2015/0154461 A1* 6/2015 Kitaura ................ G06V 20/597 348/148
2015/0156465 A1 6/2015 Tanaka
2015/0158599 A1 6/2015 Sisko
2015/0161434 A1 6/2015 Ross
2015/0163463 A1 6/2015 Hwang
2015/0179011 A1* 6/2015 Kramer .............. G07C 9/00944 340/5.71
2015/0181014 A1 6/2015 Gerhardt
2015/0181169 A1 6/2015 Kim
2015/0186840 A1 7/2015 Torres
2015/0221147 A1* 8/2015 Daniel-Wayman ...... G07C 9/21 340/5.54
2015/0235166 A1 8/2015 Brady
2015/0235172 A1* 8/2015 Hall ........................ H04W 4/12 705/333
2015/0235173 A1 8/2015 Hall
2015/0235174 A1 8/2015 Hall
2015/0235175 A1 8/2015 Hall
2015/0235301 A1 8/2015 Brady
2015/0235490 A1 8/2015 Hall
2015/0235493 A1 8/2015 Hall
2015/0235495 A1* 8/2015 Hall ................... G07C 9/00896 340/5.51
2015/0248754 A1 9/2015 Graner
2015/0248798 A1 9/2015 Howe
2015/0262443 A1 9/2015 Chong
2015/0275564 A1* 10/2015 Rosenthal ............... H04W 4/80 700/275
2015/0281268 A1 10/2015 Satish
2015/0281658 A1* 10/2015 Lee ........................ H04N 7/183 348/211.1
2015/0296183 A1 10/2015 Cho
2015/0310381 A1* 10/2015 Lyman ................. G06Q 10/083 705/330
2015/0310713 A1 10/2015 Kellermann
2015/0312531 A1 10/2015 Samad
2015/0317841 A1 11/2015 Karsch
2015/0317853 A1 11/2015 Reymann
2015/0324571 A1 11/2015 Hernoud
2015/0356802 A1 12/2015 Cho
2015/0358359 A1 12/2015 Ghai
2015/0371469 A1 12/2015 Scalisi
2015/0381949 A1 12/2015 Renkis
2016/0004229 A1 1/2016 Hall
2016/0004230 A1 1/2016 Hall
2016/0005281 A1 1/2016 Laska
2016/0010382 A1 1/2016 Cate
2016/0016664 A1 1/2016 Basuni
2016/0035198 A1 2/2016 Coviello
2016/0042333 A1 2/2016 Ho
2016/0050082 A1 2/2016 Hall
2016/0050121 A1 2/2016 Hall
2016/0055692 A1 2/2016 Trani
2016/0058181 A1 3/2016 Han
2016/0085949 A1 3/2016 Peterson
2016/0086403 A1 3/2016 Litterer
2016/0087991 A1 3/2016 Matsuoka
2016/0093180 A1 3/2016 Fitzgibbon
2016/0094815 A1 3/2016 Scalisi
2016/0096508 A1 4/2016 Oz
2016/0098670 A1 4/2016 Oz
2016/0098871 A1* 4/2016 Oz ..................... G07C 9/00571 340/5.61
2016/0098876 A1* 4/2016 Oz ..................... G07C 9/00309 340/5.61
2016/0099927 A1 4/2016 Oz
2016/0110762 A1 4/2016 Mastierov
2016/0110763 A1 4/2016 Mastierov
2016/0123619 A1 5/2016 Hester
2016/0125357 A1 5/2016 Hall
2016/0148154 A1 5/2016 Tibbs
2016/0180156 A1 6/2016 Marcheselli
2016/0180618 A1 6/2016 Ho
2016/0185466 A1 6/2016 Dreano, Jr.
2016/0189502 A1 6/2016 Johnson
2016/0194912 A1 7/2016 Fitzgibbon
2016/0196702 A1 7/2016 Wilson
2016/0196703 A1 7/2016 Jean
2016/0196704 A1 7/2016 Devin
2016/0205096 A1 7/2016 Hoyos
2016/0210454 A1 7/2016 Chou
2016/0217632 A1 7/2016 Ille
2016/0217636 A1 7/2016 Lai
2016/0217638 A1* 7/2016 Child .................. H04L 12/2827
2016/0219254 A1 7/2016 Hu
2016/0225208 A1 8/2016 Chou
2016/0247027 A1 8/2016 Tsoi
2016/0247344 A1* 8/2016 Eichenblatt ........ G07C 9/00896
2016/0258777 A1* 9/2016 Bodake ............... G06F 3/04817
2016/0265253 A1* 9/2016 Hild ................... G07C 9/00817
2016/0292942 A1 10/2016 Ranchod
2016/0300187 A1 10/2016 Kashi
2016/0300415 A1 10/2016 Deneen
2016/0300463 A1 10/2016 Mahar
2016/0307380 A1 10/2016 Ho
2016/0308859 A1 10/2016 Barry
2016/0316178 A1 10/2016 Hoeffner
2016/0316322 A1* 10/2016 Gillen ................... H04W 4/029
2016/0328894 A1 11/2016 Zhang
2016/0328898 A1 11/2016 Robinson
2016/0328903 A1 11/2016 Roberts
2016/0343187 A1 11/2016 Trani
2016/0343192 A1 11/2016 Grow
2016/0343220 A1 11/2016 Grabham
2016/0360163 A1 12/2016 Carter
2016/0360181 A1 12/2016 Drako
2016/0371642 A1 12/2016 Wilkinson
2017/0019413 A1 1/2017 Dailly

(56) References Cited

U.S. PATENT DOCUMENTS

2017/0019765 A1 1/2017 Hoyer
2017/0024691 A1 1/2017 O'Brien
2017/0034485 A1 2/2017 Scalisi
2017/0039515 A1 2/2017 Wilkinson
2017/0041745 A1 2/2017 Lott
2017/0048489 A1 2/2017 Carter
2017/0048497 A1 2/2017 Carter
2017/0055751 A1 3/2017 Sundaresan
2017/0099295 A1 4/2017 Ricci
2017/0109952 A1 4/2017 Johnson
2017/0116572 A1 4/2017 Natarajan
2017/0116835 A1 4/2017 Child
2017/0124510 A1 5/2017 Caterino
2017/0126900 A1 5/2017 Quady
2017/0131888 A1 5/2017 Hall
2017/0134244 A1 5/2017 Hall
2017/0134245 A1 5/2017 Hall
2017/0134557 A1 5/2017 Hall
2017/0134558 A1 5/2017 Hall
2017/0134559 A1 5/2017 Hall
2017/0142377 A1 5/2017 Tanaka
2017/0142544 A1 5/2017 Hall
2017/0143146 A1 5/2017 Charbeneau
2017/0144757 A1 5/2017 Hall
2017/0147979 A1 5/2017 Brady
2017/0147994 A1 5/2017 Mastierov
2017/0149623 A1 5/2017 Hall
2017/0161674 A1 6/2017 Jones
2017/0175433 A1 6/2017 Kang
2017/0187841 A1 6/2017 Hall
2017/0193465 A1 7/2017 Madura
2017/0195625 A1 7/2017 Mahar
2017/0195636 A1 7/2017 Child
2017/0198516 A1 7/2017 Dey
2017/0220872 A1 8/2017 Child
2017/0236193 A1 8/2017 Zundel
2017/0286905 A1 10/2017 Richardson
2017/0293916 A1 10/2017 Humphrys
2017/0301166 A1* 10/2017 Earles ................ G07C 9/00309
2017/0307278 A1 10/2017 Chandran
2017/0323502 A1* 11/2017 Hall ....................... G06Q 50/28
2017/0323545 A1 11/2017 Gillen
2017/0350635 A1 12/2017 Thirumurugavel
2017/0355076 A1 12/2017 Gordon-Carroll
2018/0005169 A1 1/2018 High
2018/0040216 A1 2/2018 Scalisi
2018/0041493 A1 2/2018 Wilkinson
2018/0047227 A1* 2/2018 Beavers .................. G06F 21/35
2018/0053365 A1* 2/2018 Bode .................. G06Q 10/0832
2018/0061154 A1 3/2018 Scalisi
2018/0061164 A1 3/2018 Scalisi
2018/0075680 A1 3/2018 Sommer
2018/0075681 A1* 3/2018 Scalisi ............... G06K 7/10366
2018/0082249 A1 3/2018 High
2018/0137495 A1 5/2018 Pandey
2018/0180340 A1 6/2018 Jones
2018/0191889 A1 7/2018 Gerhardt
2018/0242768 A1 8/2018 Lewis
2018/0268633 A1* 9/2018 Kwon ................ G07C 9/00857
2018/0276613 A1* 9/2018 Hall ......................... G07C 9/21
2018/0285814 A1 10/2018 Hall
2018/0308048 A1 10/2018 Nemati
2018/0315013 A1 11/2018 Wilkinson
2018/0357847 A1 12/2018 Shinar
2018/0365644 A1 12/2018 Smith
2019/0005445 A1* 1/2019 Bahrainwala ...... G06Q 10/0833
2019/0031146 A1* 1/2019 Etonye .................. B60R 25/257
2019/0034859 A1* 1/2019 Kim ................... G07C 9/00896
2019/0035187 A1* 1/2019 Kim ................... G07C 9/00182
2019/0043290 A1* 2/2019 Morris .................. E05F 15/668
2019/0077600 A1 3/2019 Watts
2019/0087775 A1* 3/2019 Buehre ............. G06Q 10/0833
2019/0102730 A1 4/2019 Giorgi
2019/0108481 A1 4/2019 Kashi
2019/0130348 A1 5/2019 Mellado
2019/0147680 A1* 5/2019 Tehranchi ............... G06F 21/35
340/5.61
2019/0167025 A1 6/2019 Cherry
2019/0188775 A1 6/2019 Rivoli
2019/0196511 A1 6/2019 Millhouse
2019/0202557 A1 7/2019 Meredith
2019/0213817 A1* 7/2019 Wechsler ........... G07C 9/00904
2019/0233103 A1 8/2019 High
2019/0241266 A1 8/2019 Thompson
2019/0244168 A1 8/2019 High
2019/0244448 A1* 8/2019 Alamin ............. G07C 9/00896
2019/0259232 A1 8/2019 Gopal
2019/0263521 A1 8/2019 O'Brien
2019/0265717 A1 8/2019 McHale
2019/0266819 A1 8/2019 McHale
2019/0282015 A1 9/2019 High
2019/0287063 A1 9/2019 Skaaksrud
2019/0300202 A1 10/2019 High
2019/0320834 A1 10/2019 Tovey
2019/0333302 A1* 10/2019 Kagnew ............. G06Q 10/0836
2019/0342702 A1* 11/2019 Shinar ..................... H04W 4/40
2019/0375594 A1 12/2019 Tovey
2019/0378086 A1 12/2019 Laye
2020/0055596 A1 2/2020 Millhouse
2020/0077826 A1 3/2020 Chenier
2020/0116414 A1 4/2020 Dade
2020/0128991 A1 4/2020 Jessie
2020/0219340 A1* 7/2020 Geerlings .......... G07C 9/00896
2020/0273133 A1 8/2020 Morris
2020/0327754 A1 10/2020 Morris
2020/0356945 A1 11/2020 Durkee
2020/0390260 A1 12/2020 Romanucci
2020/0393854 A1 12/2020 Romanucci
2021/0065489 A1* 3/2021 Hass ........................ G07C 9/22
2021/0101745 A1 4/2021 Cruz
2021/0269255 A1 9/2021 Montgomery, III
2021/0272401 A1 9/2021 Alamin
2021/0287168 A1 9/2021 Arora
2021/0315404 A9 10/2021 Waisanen
2021/0319529 A1 10/2021 High
2022/0005303 A1* 1/2022 Kim ....................... G06V 20/20
2023/0070772 A1* 3/2023 Bingham ............. G08B 19/005
2023/0090303 A1 3/2023 Morris

FOREIGN PATENT DOCUMENTS

CA 3016902 A1 9/2017
CA 3027735 A1 12/2017
CA 3033213 A1 3/2018
CA 3038525 A1 4/2018
CA 3103822 A1 8/2019
CA 2959486 C 10/2021
CN 101329779 12/2008
CN 101329779 A 12/2008
CN 103635940 3/2014
CN 103635940 A 3/2014
EP 1143835 A2 10/2001
FR 2818257 A1 6/2002
FR 3021733 A1 12/2015
FR 3082410 A1 12/2019
FR 3082411 A1 12/2019
GB 2355708 A 5/2001
JP 2012247410 12/2012
JP 5317004 10/2013
JP 2013213680 10/2013
KR 20040035952 4/2004
KR 1020040035952 4/2004
KR 20050005150 1/2005
KR 20060035951 4/2006
KR 101535411 7/2015
KR 1020180049934 5/2018
WO 20010318272 5/2001
WO 2001097664 6/2001
WO 2001067344 9/2001
WO 0210040 2/2002
WO 02100040 12/2002
WO 02100040 A 12/2002
WO 2006136662 12/2006
WO 2006136662 A 12/2006

(56) References Cited

FOREIGN PATENT DOCUMENTS

| | | |
|---|---|---|
| WO | 2010144490 | 12/2010 |
| WO | 2010144490 A | 12/2010 |
| WO | 2012151290 | 11/2012 |
| WO | 2012151290 A | 11/2012 |
| WO | 2014151249 | 9/2014 |
| WO | 2015126965 | 8/2015 |
| WO | 2016064679 | 4/2016 |
| WO | 2017116769 | 7/2017 |
| WO | 2017190026 | 11/2017 |
| WO | 2017218914 | 12/2017 |
| WO | 20170218914 | 12/2017 |
| WO | 2019071347 | 4/2019 |

OTHER PUBLICATIONS

"Cell phone controlled door lock", Copyright @ 2012, Hack a Day, [online]. Retrieved from the Internet: <URL: http:J/hackaday.com/2007/07/17/cell-phone-controlled-door-lock/>, Accessed Apr. 23, 2012), 11 pgs.
"Chinese Application Serial No. 201280032878.2, Office Action dated May 11, 2015", w/English Translation, 14 pgs.
"Chinese Application Serial No. 201280032878.2, Office Action dated Sep. 26, 2018", w/English Translation, 14 pgs.
"ECKey—Turn your phone into a Key!", [online}. Retrieved from the Internet: <URL: http://www.eckev.com/>, (Accessed Apr. 23, 2012), 2 pgs.
"iDoor—iPhone Controlled Hydraulic Door", http://varenhor.st/2009 /07 /idoor-i phone-contro lied-hydraulic-door/, retrieved Apr. 23, 2012, 12 pages.
"iDoor—iPhone Controlled Hydraulic Door", Chris Varenhorst chris@localhost, [online]. Retrieved from the Internet: <URL: http://varenhor.st/2009/07/idoor-iphone-controlledhydraulic-door/>, (Accessed Apr. 23, 2012), 12 pgs.
"Keyless entry via SMS", Copyright @ 2012, Hack a Day, [on line]. Retrieved from the Internet: <URL: http://hackaday.com/2011 /01 /24/keyless-entry-via-sms/, (Accessed Apr. 23, 2012), 9 pgs.
"Knock detecting lock", Copyright @ 2012, Hack a Day, [online]. Retrieved from the Internet: <URL: http://hackaday.com/2009/11 /04/knock-detecting-lock/>, (Accessed Apr. 23, 2012), 10 pgs.
"Knock response automatic door opener", Copyright @ 2012, Hack a Day, [on line]. Retrieved from the Internet: <URL: http://hackaday.com/2007/06/11/knock-responseautomatic-door-opener/>, (Accessed Apr. 23, 2012), 9 pgs.
"More cellphone controlled door locks", Copyright @ 2012, Hack a Day, [online]. Retrieved from the Internet: <URL: http://hackaday.com/2010/02/23/more-cellphone-controlled-doorlocks/>, (Accessed Apr. 23, 2012), 10 pgs.
"Nexia Home Intelligence", Nexia ™, [online]. Retrieved from the Internet: <URL: http://www.nexiahome.com/Products/ProductCatalog.aspx?catsel=5>, (Accessed Apr. 23, 2012), 2 pgs.
"Oliver Nash's Blog", [online]. Retrieved from the Internet: <URL: http ://ocfnash. wordpress .com/2009/10/31 /locked-out-at-2am/>, (Accessed Apr. 23, 2012), 18 pgs.
"Open Ways", OpenWays copyright 2011 , [online]. Retrieved from the Internet: <URL: http://www.openways.com/>, (Accessed Apr. 20, 2012), 1 pg.
"Opening a door via text message", [online]. Retrieved from the Internet: <URL: http:/ /anerroroccurredwhileprocessingthisdirective .com/2011 /01/01 /opening-a-door-via-textmessage/>, (Accessed Apr. 23, 2012), 8 pgs.
"Phantom Keyless Home Entry", Copyright @ 2012 Phantom Smart Home, LLC, [online]. Retrieved from the Internet: <URL: http://phantomsmarthome.com/, (Accessed Apr. 23, 2012), 1 pg.
"Remote entry via Android and Launchpad", Copyright @ 2012, Hack a Day, [online]. Retrieved from the Internet: <URL: http://hackaday.com/2012/01/24/remote-entry-viaandroid-and-launchpad/>, (Accessed Apr. 23, 2012), 9 pgs.
"SimpliciKey Electronic Door Look Solutions", Copyright @ 2011 SimpliciKey TM, [online ]. Retrieved from the Internet: <URL: http://simplicikey.com/>, (Accessed Apr. 23, 2012), 1 pg.
"Unlock you door with Siri, SMS, or a secret knock", @ 2010 laan labs, [online]. Retrieved from the Internet: <URL: http://labs.laan.com/wp/2011/10/unlock-your-door-with-siri-sms-ora- secret-knock/>, (Accessed Apr. 23, 2012), 11 pgs.
"USB Auth—Makers Local 256", Wiki pages, [online]. Retrieved from the Internet: <URL: https://256.makerslocal.ori:i/wiki/index.php/USB Auth>, (Accessed Apr. 23, 2012), 9 pgs.
"Viper SmartStart", @ Copyright 2012 Directed., [online]. Retrieved from the Internet: <URL: http://www.vioer.com/smartstartl>, (Accessed Apr. 23, 2012), 2 pgs.
"Yale demos NFC-enabled residential locks, germaphobes rejoice", @ 2012 AOL Inc, onlinel. Retrieved from the Internet: <URL:, (Accessed Apr. 23, 2012), 4 pgs.
"Zwave Products", Copyrights @ 2012—Zwave Products Inc, [online]. Retrieved from the Internet: <URL: http://www.zwaveoroducts.com/KWIKSET.html>, (Accessed Apr. 23, 2012), 3 pgs.
Amazon Help; How In-Home Delivery Works; https://www.amazon.com/gp/help/customer/display.html?nodeld=202104360; 2 pages; Known as early as Oct. 2017.
U.S. Appl. No. 13/462,669 , Response filed Nov. 19, 2013 to Non Final Office Action dated Aug. 26, 2013; 12 pgs.
U.S. Appl. No. 13/462,669, Examiner Interview Summary dated Nov. 14, 2013, 3 pgs.
U.S. Appl. No. 13/462,669, Non Final Office Action dated Aug. 26, 2013, 17 pgs.
U.S. Appl. No. 14/508,501, Non Final Office Action dated Mar. 6, 2015, 15 pgs.
Author: Alarm.com; Title: MyQ Garage Universal Retrofit, Installation Guide; Date: 2004, Publisher: Alarm.com Pertinent Pages: Whole document (Year: 2014).
BenchSentry + Aladdin Connect; Protect any size delivery with the ultimate package theft solution; publicly available as early as Apr. 28, 2021; 9 pages; https://benchsentry.com.
Boxlock; Secure & Contactless Delivery Solutions | Package Security; The Supply Chain Access Control Platform; publicly available as early as Apr. 28, 2021; 6 pages; https://www.getboxlock.com.
Computer rendering of deadbolt lock publicly available before Aug. 1, 2017, 1 page.
Danby ParcelGuard; Stop Porch Pirates in Their Tracks With the World's Smallest Mailbox; publicly available as early as Apr. 28, 2021; 9 pages; https://www.danbyparcelguard.com/en-us/.
Dynosafe; Own the Porch—The original climate-controlled, smart home-enabled delivery lockbox; publicly available as early as Apr. 19, 2021; 10 pages; https://www.dynosafe.com.
HomeValet Launches Revolutionary Contactless Home Delivery System; The HomeValet-Powered SmartBox; publicly available as early as Apr. 28, 2021; 2 pages; https://www.perishablenews.com/retailfoodservice/homevalet-launches-revolutionary-contactless-home-delivery-system/ .
Hot Stuff: [Morning Edition]; by Andre Mouchard: The Orange County Register; Publication Jul. 20, 1998; 3 pages, https://dialog.proquest.com/professional/printviewfile?accountid=. . . .
International Application Serial No. PCT/U2012/036141, International Search Report dated Nov. 15, 2013, 4 pages.
International Application Serial No. PCT/US2012/036141 , International Preliminary Report on Patentability dated Nov. 5, 2013, 7 pgs.
International Application Serial No. PCT/US2012/036141, Written Opinion dated Nov. 15, 2013, 6 pgs.
International Search Report and Written Opinion; Corresponding PCT Patent Application No. PCT/US2020/021329; dated Sep. 23, 2020; 13 pages.
Inventors Devise New Mailboxes for Bulky E-Commerce Packages; The Wall Street Journal; By Robert Johnson—Staff Reporter of the Wall Street Journal; 4 pages, Updated Aug. 17, 1999.
Liviri Deliver Different; Liviri Reusable Insulated Boxes | Reimagine the Box; publicly available as early as Apr. 28, 2021; 11 pages; https://liviri.com.
Meet HomeValet; publicly available as early as Apr. 28, 2021; 5 pages; https://www.homevalet.co.

(56) References Cited

OTHER PUBLICATIONS

Non-Patent Literature document Description of STM Electronics FlightSense product; publicly available before May 12, 2021, 1 page.
PCT Patent Application No. PCT/US2018/044625; International Search Report and Written Opinion dated Nov. 18, 2018; 12 Pages.
PCT Patent Application No. PCT/US2019/027632; International Search Report and Written Opinion dated Aug. 4, 2019, 10 pages.
Phantom Smart Smart Home; Hands-Free Keyless Home Entry, https://web.archive.org/web/20110222072442/http:/www.phantomsmarthome.com/; 3 pages, copyright 2011.
Porchster; Smart Delivery Locker; Parcel Locker, Delivery Locker Mailbox; publicly available as early as Apr. 28, 2021; 5 pages; https://porchster.com.
RGJ.com website, https://www.rgj.com/story/life/food/2017/09/05/only-rgj-com-uber-eats-debuts- wednesday-reno/632015001/, dated Sep. 5, 2017, 4 pages.
Samsung SpaceMax Family Hub IOT Refrigerator; Published Oct. 23, 2020; https://www.youtube.com/watch?v=njsZJtEi5z4; 21 pages.
Samsung SpaceMax Family Hub; It's More than a Fridge; Published: Jul. 26, 2020; https://www.youtube.com/watch?v=hcMx9flBdCA; 7 pages.
Sorex_wirelessKey_2_0-Sorex Wayback site of Sep. 6, 2011, 2 pages.
SOREX_wirelessKey_Folder_2009, 2 pages.
The Verge website, https://www.theverge.com/2017/10/25/16538834/amazon-key-in-home-delivery- unlock-door-prime-cloud-cam-smart-lock, dated Oct. 25, 2017, 5 pages.
Todd Bishop; Creeped out by Amazon Key? How the In-Home Delivery Service Will Work; https://www.geekwire.com/author/todd/) on Oct. 26, 2017 at 7:26 am.
Two-Factor Authentication with Proximity Uses iBeacon Bluetooth Low Energy (BLE) to Authenticate Users Instantly, https://saaspass.com/technologies/proximity-instant-login-two-factor-authentication-beacon.html, 5 pages, Known as early as Nov. 6, 2017.
U.S. Appl. No. 13/462,714, Non-Final Office Action dated Aug. 26, 2013, 17 pages.
U.S. Appl. No. 13/462,669, Final Office Action dated Feb. 24, 2014, 22 pgs.
U.S. Appl. No. 13/462,669, Non Final Office Action dated Aug. 26, 2013, 18 pgs.
U.S. Appl. No. 13/462,714, Examiner Interview Summary dated Mar. 7, 2014, 3 pgs.
U.S. Appl. No. 13/462,714, Final Office Action dated Apr. 7, 2014, 20 pgs.
U.S. Appl. No. 13/462,714, Non Final Office Action dated Aug. 26, 2013, 17 pgs.
U.S. Appl. No. 13/462,714, Response filed Feb. 26, 2014 to Non Final Office Action dated Aug. 26, 2013, 15 pgs.
U.S. Appl. No. 13/462,765, Non Final Office Action dated Sep. 4, 2014, 11 pgs.
U.S. Appl. No. 14/468,114, Final Office Action dated Mar. 15, 2016, 13 pgs.
U.S. Appl. No. 14/468,114, Non Final Office Action dated Jul. 21, 2016, 11 pgs.
U.S. Appl. No. 14/468,114, Preliminary Amendment filed Aug. 27, 2014, 7 pgs.
U.S. Appl. No. 14/638,828, Examiner Interview Summary dated Mar. 4, 2016, 3 pgs.
U.S. Appl. No. 14/638,828, Final Office Action dated May 16, 2016, 15 pgs.
U.S. Appl. No. 14/638,828, Non Final Office Action dated Jan. 11, 2017, 13 pgs.
U.S. Appl. No. 14/638,828, Non Final Office Action dated Oct. 26, 2015, 11 pgs.
U.S. Appl. No. 14/638,828, Response filed Feb. 26, 2016 to Non Final Office Action dated Oct. 26, 2015, 12 pgs.
U.S. Appl. No. 14/638,828, Response Filed Nov. 16, 2016 to Final Office Action dated May 16, 2016, 12 pgs.
U.S. Appl. No. 17/741,620, filed May 11, 2022, titled Product Delivery System and Method.
U.S. Appl. No. 18/082,310, filed Dec. 15, 2022; 61 pages.
U.S. Appl. No. 16/050,923; filed Jul. 31, 2019; 32 pages.
U.S. Appl. No. 16/050,923; Office Action dated Apr. 10, 2019; 47 Pages.
U.S. Appl. No. 16/383,093, filed Apr. 12, 2019; 64 pages.
U.S. Appl. No. 17/323,196; Notice of Allowance dated Jul. 25, 2022; 39 Pages.
U.S. Appl. No. 17/992,691, filed Nov. 22, 2022; 63 pages.
U.S. Appl. No. 16/912,104; Office Action dated Jun. 16, 2022; 46 pages.
USPTO; U.S. Appl. No. 16/050,923; Notice of Allowance dated Mar. 4, 2020; (pp. 1-10).
USPTO; U.S. Appl. No. 16/050,923; Office Action dated Nov. 27, 2019; (pp. 1-27).
USPTO; U.S. Appl. No. 16/383,093; Corrected Notice of Allowability dated Mar. 22, 2021; (pp. 1-2).
USPTO; U.S. Appl. No. 16/383,093; Notice of Allowance dated Feb. 16, 2021; (pp. 1-20).
USPTO; U.S. Appl. No. 16/383,093; Office Action dated Sep. 17, 2020; (pp. 1-13).
USPTO; U.S. Appl. No. 16/912,104; Non-Final Rejection dated Jun. 17, 2022; (pp. 1-16).
USPTO; U.S. Appl. No. 16/912,104; Notice of Allowance and Fees Due (PTOL-85) dated Oct. 4, 2022; (pp. 1-15).
USPTO; U.S. Appl. No. 16/912,104; Office Action (Non-Final Rejection) dated Aug. 12, 2021; (pp. 1-19).
USPTO; U.S. Appl. No. 17/323,196; Non-Final Rejection Oct. 6, 2021; (pp. 1-13).
USPTO; U.S. Appl. No. 17/323,196; Non-Final Rejection dated Apr. 12, 2022; (pp. 1-12).
USPTO; U.S. Appl. No. 17/323,196; Notice of Allowance and Fees Due (PTOL-85) dated Jul. 25, 2022; (pp. 1-8).
USPTO; U.S. Appl. No. 17/323,196; Notice of Allowance and Fees Due (PTOL-85) dated Nov. 7, 2022; (pp. 1-2).
Wayback Machine capture of https://about.ubereats.com/, capture dated Jun. 3, 2017, 7 pages.
Wayback Machine capture of https://en.wikipedia.org/wiki/Sally_port, capture dated Nov. 11, 2016, 3 pages.
wirelessKey Hardware Deutsch 1.1 Sep. 6, 2011 Wayback Machine, (with Google Machine Translation) 34 pages.
Yale; Smart Delivery Box; Copyright @ Yale, Assa Abloy Residential Group; publicly available as early as Apr. 28, 2021; 3 Pages; https://us.yalehome.com/en/yalhome-products/yale-smart-storage1/yale-smart-storage/smart-delivery-box/.
YouTube Video entitled Bluetooth Sorex Wirelss Key, dated Mar. 5, 2009, 5 pages.
YouTube Video entitled Bluetooth SorexLoXX Entrance System, dated Mar. 5, 2009, 9 pages.
YouTube Video entitled Bluetooth-Sorex LoXX dated Feb. 5, 2009, 8 pages.

* cited by examiner

SYSTEM FOR FACILITATING ACCESS TO A SECURED AREA

CROSS-REFERENCE TO RELATED APPLICATIONS

This application is a continuation of U.S. patent application Ser. No. 16/912,104, filed Jun. 25, 2020, which is a continuation of U.S. patent application Ser. No. 16/050,923, filed Jul. 31, 2018, now U.S. Pat. No. 10,713,869, issued on Jul. 14, 2020, which claims the benefit of U.S. Provisional Patent App. No. 62/659,535, filed Apr. 18, 2018 and U.S. Provisional Patent App. No. 62/540,047, filed Aug. 1, 2017, which are all hereby incorporated by reference herein in their entireties.

FIELD

This disclosure relates to barrier operators and, more specifically, to a system and method for facilitating a grant of conditional, temporary authorization to operate a movable barrier operator associated with a secured area.

Background

Moveable barrier operators, such as garage door openers, secure areas and move barriers in response to received signals from transmitters. Different kinds of transmitters, such as portable transmitters or stationary transmitters, may be used to operate moveable barrier operators. One type of a stationary transmitter is a keypad mounted near the movable barrier.

In one prior system, a user orders a product online and a delivery service is able to open a user's garage door to complete an unattended delivery of the ordered product because a computer of the delivery service can communicate with a home automation system associated with the garage door opener. Temporary or one-time access can be granted to the delivery person or associate by establishing and providing a temporary or one-time use entry code. The delivery person enters the one-time use entry code into an outdoor, stationary keypad near the garage door, and the code is communicated to the garage door opener such that the garage door opener opens the garage door. The one-time use entry code differs from the code used by the residents to operate the moveable barrier operator. Temporary or one-time access may be given to other types of guests besides delivery associates, such as contractors or visitors.

While temporary or one-time use codes limit the number of times and/or amount of time a guest can open the barrier, they do not limit access to the secured area once beyond the moveable barrier. For example, access to an attached garage provides access to a passageway door of the garage which leads to an interior of the associated house or multi-tenant building. In some instances a resident or a home owner may wish to give a guest access to the garage without permitting the guest to open the passageway door. Accordingly, the passageway door should be kept locked, necessitating the resident to carry a key, fob, keycard, or the like. Additionally, if multiple guests are granted temporary or one-time entry codes, some may have to be given keys to the passageway door if access to the house is necessary.

DETAILED DESCRIPTION

Figure 1:
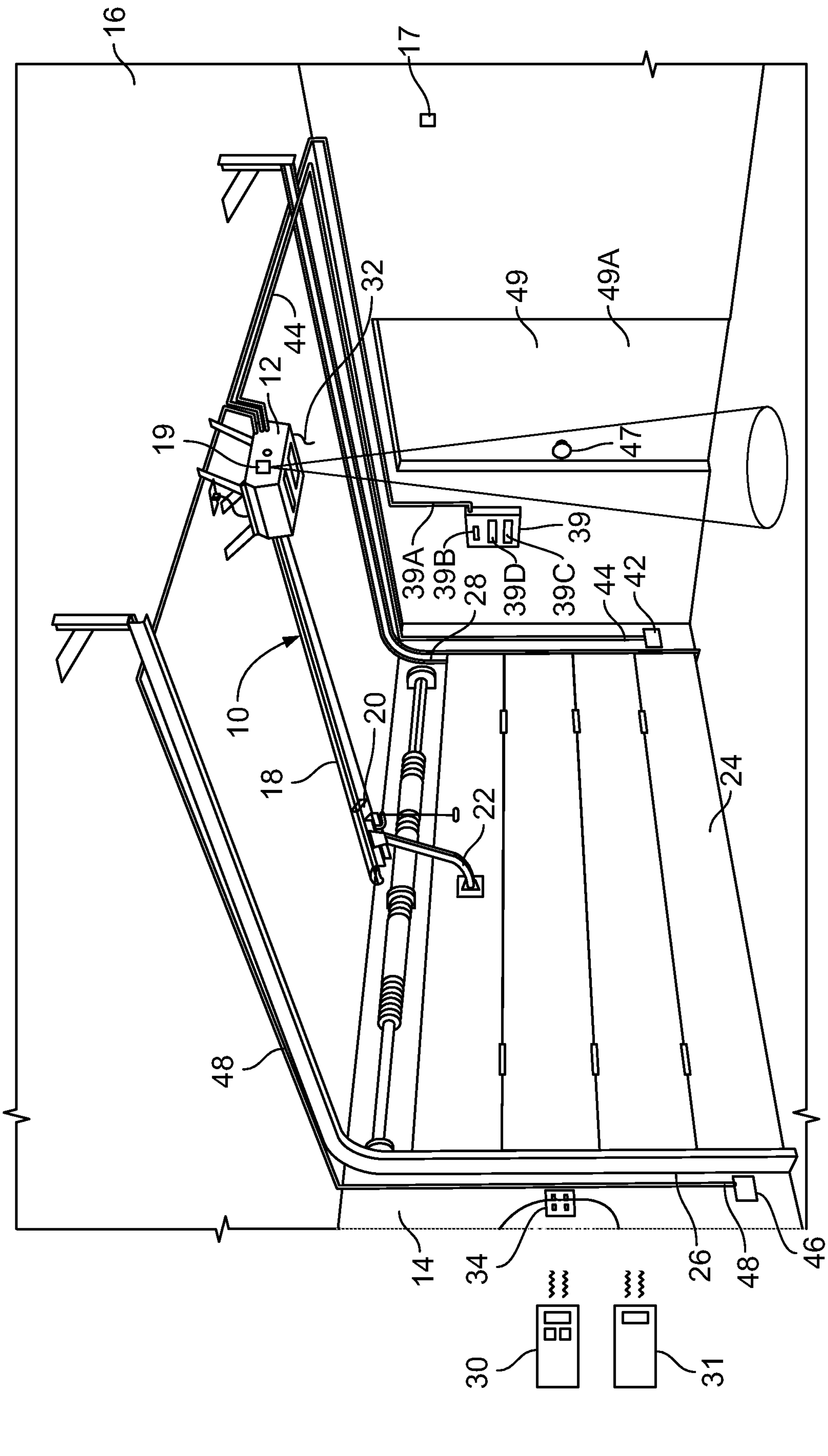
FIG. 1 is a perspective view of a garage having a movable barrier operator and a passageway door.

In accordance with one aspect of the present disclosure, a system is provided for controlling access to a secured area having a first barrier and a second barrier. The system includes a moveable barrier operator configured to control movement of the first barrier, such as a movable barrier, and a lock configured to secure the second barrier, such as a passageway door. In one form, the moveable barrier operator is a garage operator (also known as a garage door opener, garage door operator, or GDO) and the passageway door is a door leading from the garage to an adjacent area or attached structure, such as a house. The system receives a control signal including a code from a remote control. The remote control may be a wireless transmitter such as a visor-mounted transmitter, a fixed transmitter, such as a keypad, or a portable electronic device, such as a smartphone. The system authenticates the signal to determine whether the received signal is a primary signal (associated with a resident) or a secondary signal (associated with a guest) based at least in part on a code (e.g., a fixed identification (ID) code that uniquely identifies the remote control or transmitter) of the signal. The primary signal is associated with a first level of access that permits a user to pass through both the garage door and the passageway door. The secondary signal is associated with a second level of access that permits a user to pass through the garage door but not the passageway door. As such, the system opens the garage door and unlocks the passageway door in response to a primary signal and opens the garage door and locks the passageway door in response to a secondary signal. In some forms, the movable barrier operator moves the garage door a first distance (e.g., fully opens the garage door) in response to a primary signal and opens the garage door a shorter distance (e.g., just far enough to slide in a package for delivery) in response to a secondary signal. The secondary signal may include information regarding how far the movable barrier operator should open the garage door.

In some forms, the type of signal is determined by the movable barrier operator. The signal may be sent to the movable barrier operator directly from the remote control, such as if the remote control is a visor-mounted transmitter.

Alternatively, the signal may be sent to the garage door indirectly such as if the remote control is a smartphone. For example, a user may use an application running on her smartphone to send a signal to cause the movable barrier operator open or close the garage door. The smartphone sends the signal to a cloud-based computing device such as a server computer. The server computer determines whether the smartphone is associated with a resident or a guest, and sends either a primary signal or the secondary signal to the movable barrier operator.

If the movable barrier operator receives a primary signal, the movable barrier operator transmits a signal that causes a lock of the passageway door to unlock. In some forms, the movable barrier operator transmits a signal directly to the passageway door lock. Alternatively, the movable barrier operator and passageway door lock are both communicatively coupled to a common local communication hub. The operator transmits a signal to a server computer via the local communication hub and the server computer sends another signal through the local communication hub to the passageway door lock to control the passageway door lock.

If the movable barrier operator receives a secondary signal, the movable barrier operator transmits a signal that causes the passageway door lock to become locked. In one form, the passageway lock includes a sensor configured to determine if the lock is in a locked state or unlocked state. The state of the passageway lock may be transmitted directly or indirectly from the passageway lock to the movable barrier operator. The movable barrier operator analyzes the transmitted signal to check the state of the passageway lock and determine if the state of the passageway lock needs to be changed. The analysis of the transmitted signal may include decrypting the transmitted signal. The moveable barrier operator or the server computer transmits a lock or unlock command to the lock directly or indirectly if the lock is not in the desired state. Further, the state of the lock may be stored locally such as in a memory of the lock, the operator, or a local hub. In another embodiment, the state of the lock is stored on a remote server computer.

In alternative forms, the determination of whether a control signal is a primary signal or a secondary signal is made by a device other than the movable barrier operator, such as a remote server computer. For example, a smartphone transmits a control signal to the server computer. The server computer determines whether the signal is a primary signal or a secondary signal and sends actuation signals to the moveable barrier operator and passageway door lock as needed to effectuate the level of access associated with he control signal.

Referring now to FIG. 1, a garage 14 having a movable barrier operator system 10 is provided. The movable barrier operator system 10 includes a movable barrier operator 12, such as a garage door opener, mounted within a secured area, such as a garage 14. More specifically, the movable barrier operator 12 is mounted to a ceiling 16 of the garage 14 and includes a rail 18 extending therefrom with a releasable trolley 20 attached having an arm 22 extending to a multiple paneled garage door 24 positioned for movement along a pair of door rails 26 and 28. The movable barrier operator 12 has a motor coupled to the door 24 by the trolley 20 and arm 22, by which the motor moves the door 24. The system 10 includes remote controls such as hand-held transmitter units 30, 31 configured to send signals for reception by communication circuitry through an antenna 32 of the movable barrier operator 12. The remote controls may also include an external control pad 34, with a button or buttons thereon, that is positioned on the outside of the garage 14. The external control pad 34 communicates signals via radio frequency transmission for reception by the antenna 32 of the movable barrier operator 12. A switch module 39 is mounted on a wall of the garage 14. The switch module 39 is connected to the movable barrier operator 12 by one or more wires 39A although the switch module 39 may alternatively communicate with the movable barrier operator 12 wirelessly or via a combination of wired and wireless signals. The switch module 39 includes a light switch 39B, a lock switch 39C, and a command switch 39D. An optical emitter 42 is connected via a power and signal line 44 to the movable barrier operator 12. An optical detector 46 is connected via a wire 48 to the movable barrier operator 12. Alternatively, at least one of the optical emitter 42 and the optical detector 46 may communicate wirelessly with the movable barrier operator 12. Furthermore, the optical emitter 42 and the optical detector 46 may be combined as a single unit known in the art as a retroreflector.

The movable barrier operator system 10 includes a wired or wireless camera 17 situated to capture security data such as pictures, video, and/or audio within the garage 14. The camera 17 may be configured to continuously capture security data. Alternatively, the camera 17 captures security data at certain times. For example, the camera 17 may be configured to start capturing security data when the movable barrier operator system 10 opens or begins to open the garage door 24. The camera 17 continues capturing security data until the garage door 24 is closed or a predetermined amount of time after the garage door 24 is closed. In further examples, the camera 17 is configured to start capturing security data in response to the system 10 determining that a received control signal is a secondary signal but not in response to a determination that a received control signal is a primary signal.

In some forms, the camera 17 is remotely movable such that a user viewing a video stream from the camera 17 via a wireless device, such as a smartphone, can adjust the camera 17 to change the field of view. The moveable barrier operator system 10 includes an adjustable indicator 19 for indicating a position within the garage 14. The indicator 19 may be integral with or independent from the moveable barrier operator 12. The indicator 19 projects light, such as a cone of light, to illuminate an area. For example, the indicator 19 may include one or more lightbulbs or LEDs directed to form a shape such as a cone, a pyramid, a circle, or a rectangle on a surface such as the floor of the garage 14. Alternatively or additionally, the indicator 19 includes a laser to form one or more shapes on a surface such as a small circle, a rectangle, and/or an arrow on the floor of the garage 14. The indicator 19 may alternatively or additionally include a speaker and/or a display screen to indicate the desired dropoff location.

The indicator 19 may be used to assist in parking a vehicle within the garage 14. Further, the indicator 19 may be used to indicate a point or illuminated area in the garage 14 for delivery associates to drop or otherwise deposit or place packages or parcels. In some forms, the indicator 19 includes one or more servo motors and is remotely controllable such that the user can use, for example, an application running on the user's smartphone to adjust the indicator 19 in real-time to indicate a desired location for a package within the garage 14 to a delivery associate. The moveable barrier operator 12 may store programmed orientations for the indicator 19 and may adjust the orientation of the indicator 19 based on the operation of the movable barrier operator system 10. For example, the movable barrier operator 12 uses a first stored orientation of the indicator 19 when the user enters the garage 14 to aid in parking. The movable barrier operator 12 uses a second stored orientation of the indicator 19 when a delivery associate enters the garage 14 to indicate a delivery location. Once the delivery associate has delivered the package in the garage 14, the indicator 19 reverts back to the first orientation to assist in parking within the garage 14.

In operation, the indicator 19 is operated to indicate the stored desired location in response to a control signal being authenticated as a secondary signal, but not in response to a control signal being authenticated as a primary signal.

In another embodiment, the user may specify package delivery location by having the movable barrier operator 12 detect a specific action performed by the user. For example, the movable barrier operator 12 may include one or more microphones and the movable barrier operator 12 is configured to use the microphones for voice recognition and/or sound localization. As an example, the movable barrier operator 12 may be configured to detect the user speaking a trigger word or phrase when the user is within the garage 14 such as "deliver here!" followed by stomping her foot twice at a spot on a floor of the garage 14. The movable barrier operator 12 may detect the desired location using audio sensors (e.g., triangulating position using microphones) and/or using optical position sensors. The movable barrier operator 12 may then operate the indicator 19 to indicate the desired location when the delivery associate enters the garage 14.

In some forms, the moveable barrier operator 12 further includes a speaker and/or a microphone such that verbal communications can be exchanged between a delivery associate within the garage 14 and a remote user.

Figure 2:
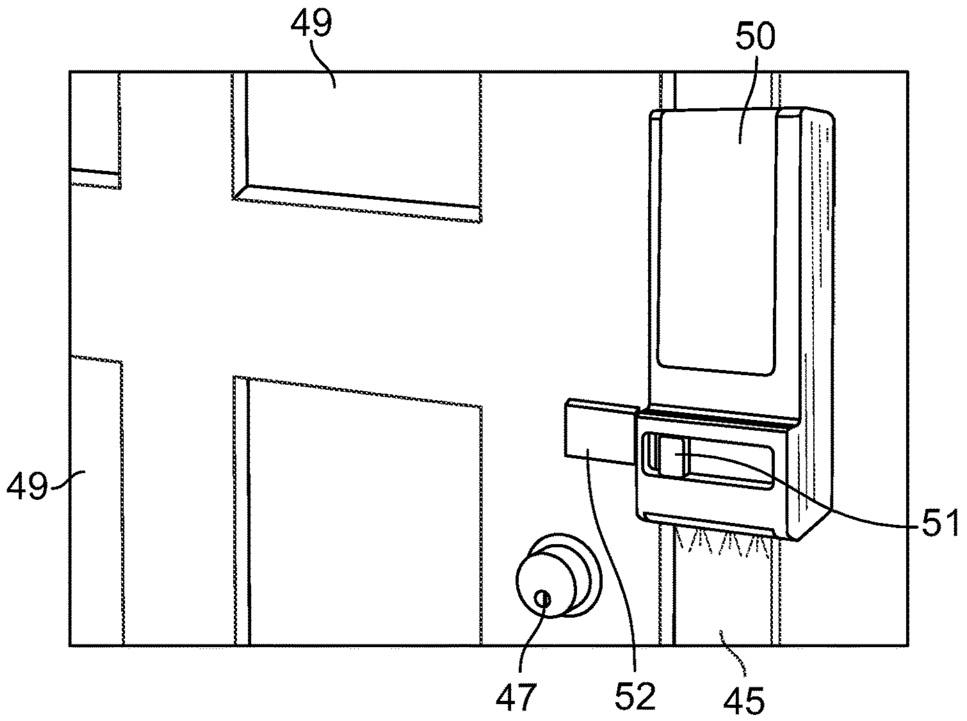
FIG. 2 is a perspective view of the passageway door of FIG. 1 having a passageway door lock on an interior side of the door.

The garage 14 includes a passageway door 49 having hardware 47, such as a doorknob and/or deadbolt. The door 49 separates the garage 14 from an adjacent area or attached structure, such as a house, that is desired to be secured in certain instances. The door 49 has an exterior surface 49A facing the garage 14 and an interior surface 49B facing the house. FIG. 2 is a perspective view of the interior side 49B of the door 49. A passageway door lock 50 is mounted adjacent the door 49 such that a bolt 52 of the lock 50 may obstruct the door 49 by inhibiting an inward swing of the door 49, thereby preventing the door 49 from being opened. The movable barrier operator 12 is in communication with the lock 50 and may cause automatic locking of the lock 50 in response to a guest such as a delivery associate opening the garage door 24. In one form, the lock 50 includes a manual actuator 51 enabling a user to manually shift the bolt 52 between unlocked and locked positions and open the door 49. The lock 50 is mounted to a door jamb 45 associated with the door 49 such that the bolt 52 extends along a portion of the door's interior surface 49B. In one form, neither the door 49 nor the jamb 45 need to be modified, such as by cutting mortises or cavities, to receive the bolt 52 or the lock 50.

Figure 3:
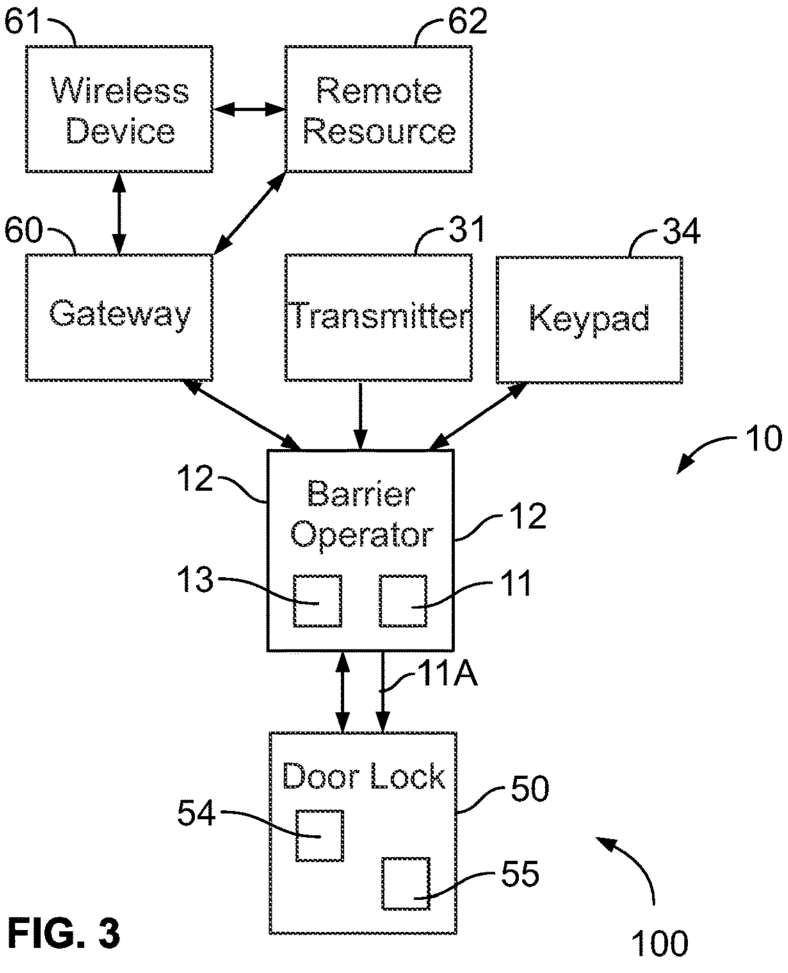
FIG. 3 is a block diagram of a system including the movable barrier operator and the passageway door lock of FIGS. 1 and 2.

A passageway lock system 100 is provided as a block diagram in FIG. 3 and includes the moveable barrier operator 12 and the lock 50. The moveable barrier operator 12 includes wireless communication circuitry 11, such as a receiver and transmitter or a transceiver. The movable barrier operator 12 also includes a controller 13 that includes a processor and a non-transitory computer readable memory.

The wireless communication circuitry 11 may be configured to communicate over one or more frequencies, such as standard 300 MHz-400 MHz frequencies, and one or more protocols, such as Bluetooth®, Wi-Fi, ZigBee, or infrared (IR). In one form, the wireless communication circuitry 11 includes a transceiver (or a separate receiver and transceiver) for communicating via 300 MHz-400 MHz signals with a garage door opener transmitter, as well as a Bluetooth® and/or Wi-Fi transceiver (or a separate transmitter and receiver) for communicating with the lock 50 and/or a gateway 60. The gateway 60 may provide wireless access to an external network, such as the internet. The gateway 60 may be a router, access point or a "smart" house hub. Although the lock 50 is shown as communicating with the moveable barrier operator 12, the lock 50 may additionally or alternatively communicate with gateway 60. In an example the lock 50 and the moveable barrier operator 12 communicate indirectly with each other via gateway 60 and/or a cloud (e.g., network-based service) that is instantiated or otherwise executed by a remote entity such as a network device or server computer.

In operation, the movable barrier operator 12 receives a signal. The signal can be transmitted from one of multiple remote controls, including the keypad 34, the portable transmitters 30, 31, or another remote control such as a wireless device 61. The wireless device 61 may be a smartphone or tablet communicatively coupled to the movable barrier operator 12 by the gateway 60. For example, a user may send open or close commands to the movable barrier operator 12 using an application running on the user's smartphone. The user's smartphone communicates with a remote resource 62, such as a server, via a cellular telephone system and the internet. In response to receiving the communication from the user's smartphone, the remote resource 62 sends a signal to the movable barrier operator 12 via the internet. The signal may include data representing the identity of the smartphone and/or user and a code associated with the moveable barrier operator 12. If the signal is sent using the keypad 34, the keypad 34 sends a code entered by a user to the moveable barrier operator 12. A controller 13 of the moveable barrier operator 12 parses and decrypts the signal to determine if the code(s) are valid, and determines the permissions associated with the identified remote control and/or user. Among the permissions determined by the moveable barrier operator 12 is whether to unlock the lock 50 to give access to the house.

If an identified user/remote control is permitted access to the garage 14 and the house, the moveable barrier operator 12 transmits a signal 11A to the door lock 50 containing a command to unlock the passageway door 49. The door lock 50 receives the command at communication circuitry 54, which may include a receiver and a transmitter, and actuates the bolt 52 (FIG. 2) into an unlocked or retracted position. In some forms, the signal 11A transmitted to the door lock 50 is encrypted, and the door lock 50 includes a controller 55 configured to decrypt the signal. The signal 11A may be sent via wired or wireless approaches.

If the identified user/remote control is permitted access to the garage 14 but is not permitted access to the house, the moveable barrier operator 12 transmits the signal 11A containing a lock command to the door lock 50. The door lock 50 receives the signal 11A at the communication circuitry 54 and in response, actuates the bolt 52 into a locked or extended position. The movable barrier operator 12 thereby causes the door lock 50 to secure the door 49 (FIGS. 1 and 2) before or concurrent with the movable barrier operator 12 starting to open the garage door 24. If the movable barrier operator 12 receives the signal 11A from a remote control that is unauthorized, the movable barrier operator 12 does not open the garage door 24.

Figure 4A:
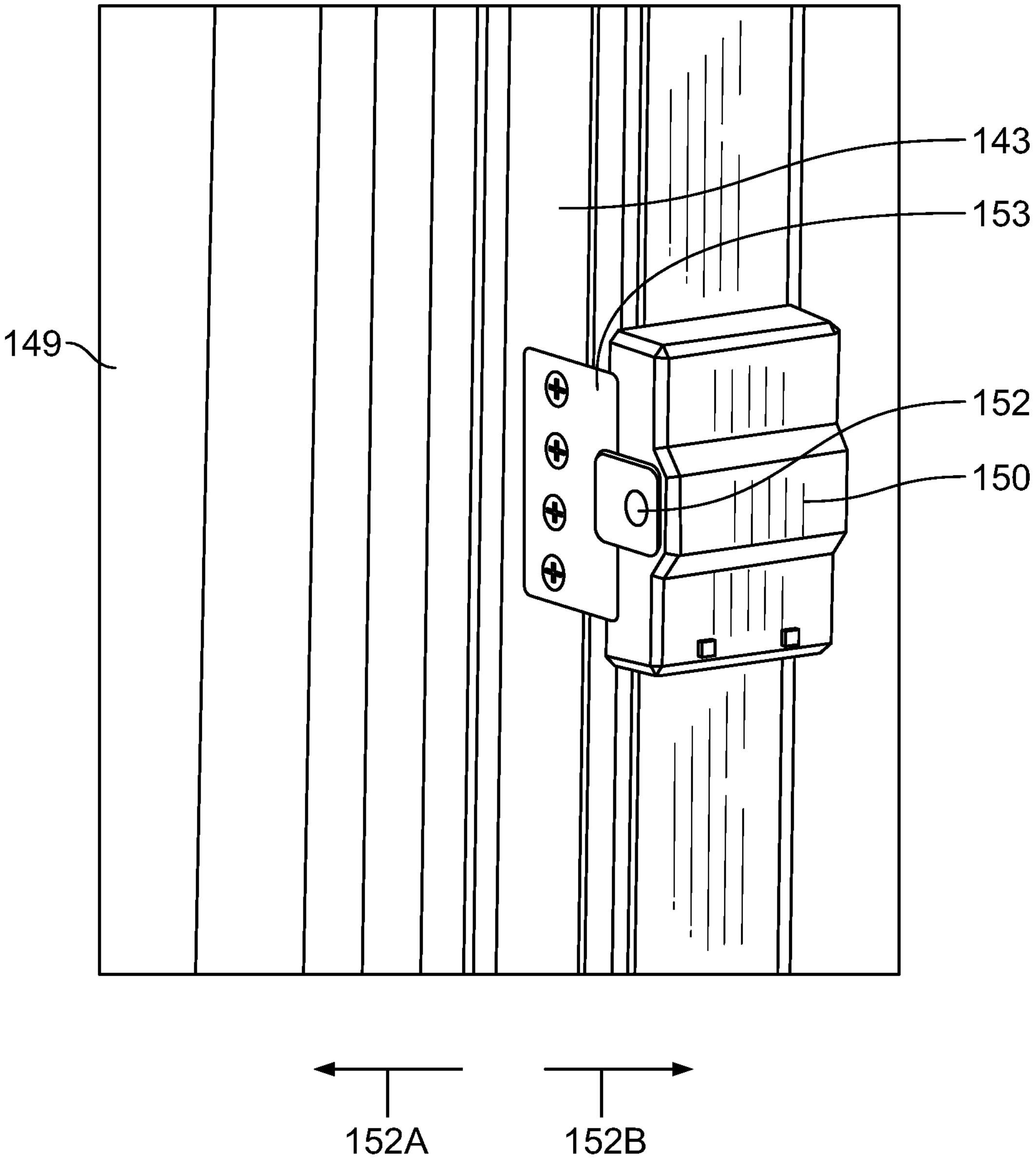
FIG. 4A is a perspective view of a passageway door lock.
Figure 4B:
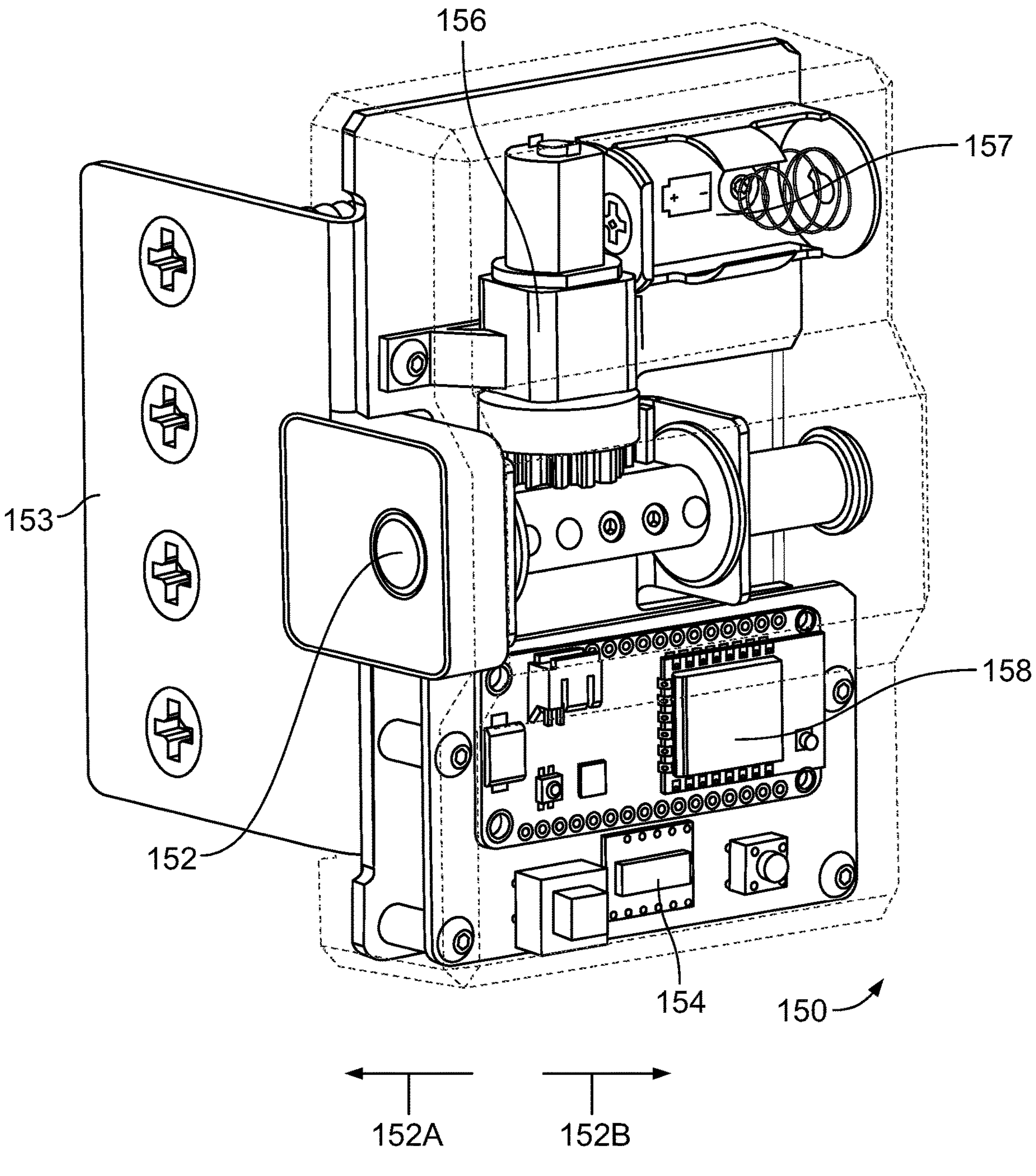
FIG. 4B is a perspective view of the lock of FIG. 4A with a housing of the lock transparent to show internal components of the lock.
Figure 4C:
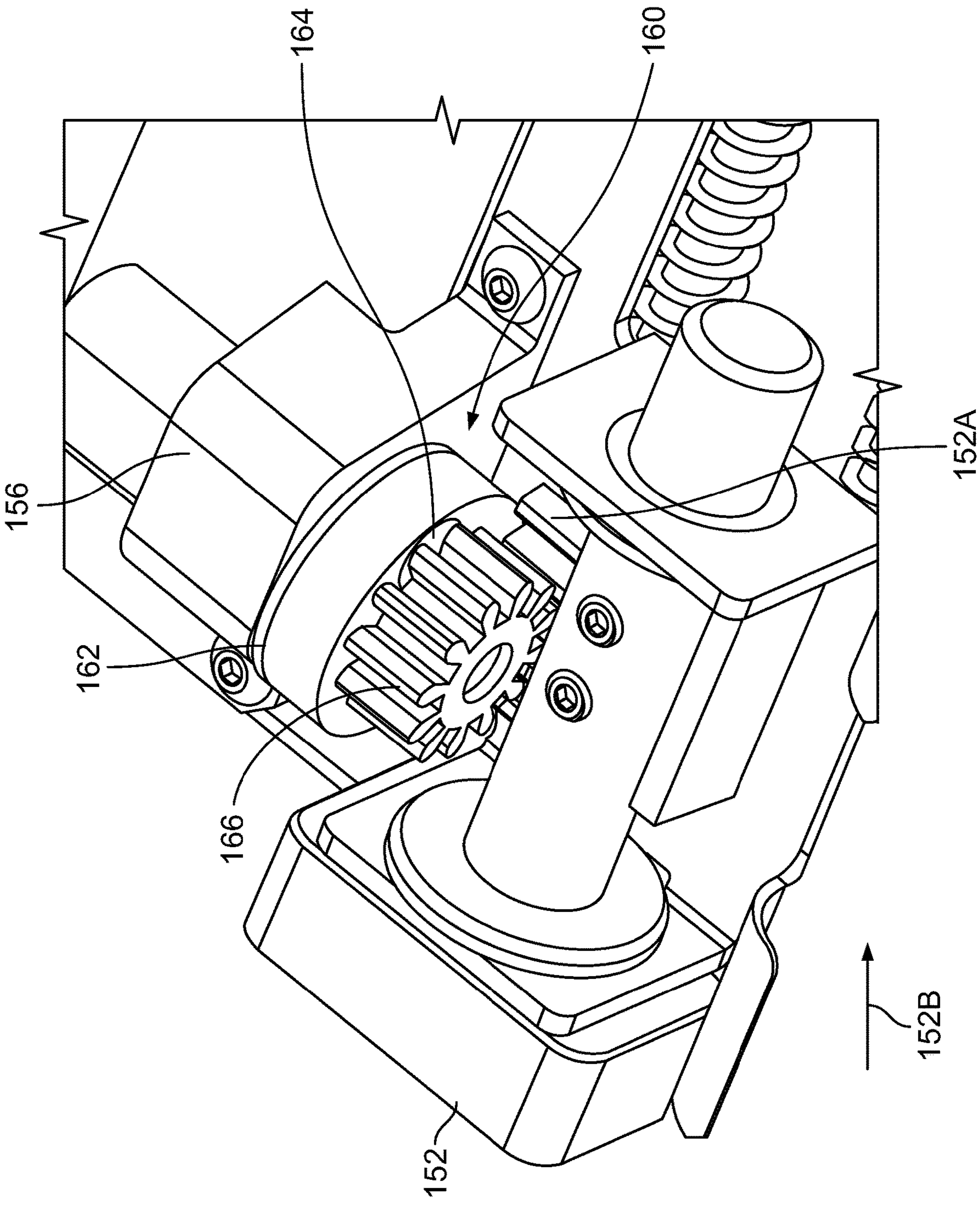
FIG. 4C is a perspective view of drive elements of the lock of FIGS. 4A and 4B.

FIGS. 4A-4C illustrate a passageway door lock 150 configured to secure a passageway door 149. The lock 150 includes a bolt 152 shiftable in direction 152A to an extended position to obstruct opening of the door 149 when the door 140 is closed. The lock 150 is mounted adjacent the door 149 by a mounting plate 153 secured to a door jamb 143. In one form, the mounting plate 153 is secured to the jamb 143 by a plurality of fasteners such as screws or nails long enough to extend into a structural or supporting member (e.g., a metal or wood stud) adjacent to the door 149. The bolt 152, mounting plate 153, and other components of the lock 150 may be made of steel, alloy or other material having high strength.

With reference to FIG. 4B, the lock 150 includes a rotary or linear actuator such as an electric motor 156 configured to drive or actuate the bolt 152. The electric motor 156 is operable to drive the bolt 152 in direction 152A to extended, locked position or in direction 152B to a retracted, unlocked position. The electric motor 156 is powered by a power source 157, such as a battery. In some forms, the lock 150 is additionally or alternatively wired to the electrical system of the house or associated structure. The motor 156 is controlled by a controller 158 and/or associated circuitry. A receiver 154 is communicatively coupled to the controller 158. In operation, the receiver 154 receives a signal from the moveable barrier operator 12 and/or the gateway 60 and transmits the received signal to the controller 158. The controller 158 analyzes the signal to determine whether to operate the motor 156. The controller 158 then connects the motor 156 to the power source 157 such that the electric motor 156 drives the bolt 152 to the locked or unlocked position.

In one form, the lock 150 includes a slip clutch 160 as shown in FIG. 4C. The slip clutch 160 includes a metal plate 162 coupled to a drive shaft of the motor 156. When the motor 156 is powered, the motor 156 rotates the plate 162. A magnet 164 is mounted to the plate 162. The magnet 164 is coupled magnetically to a pinion gear or sprocket 166 that engages a toothed rack 166A fixed to the bolt 152. In standard operation, rotating the plate 162 causes the magnet 164 and, in turn, the sprocket 166 to rotate. Teeth of the rotating sprocket 166 mesh with complementary teeth of the rack 152A and cause the bolt 152 to be driven inwardly in direction 152B or outwardly in direction 152A. However, if force is applied to the bolt 152 in direction 152B, such as by a manual actuator (e.g., actuator 51 of FIG. 2), the bolt 152 imparts torque on the sprocket 166 causing the magnet 164 to rotate or slip relative to the plate 162. The slipping allows the bolt 152 to be moved without turning the driveshaft of the motor 156 and possibly damaging the motor 156. The slipping permits a person inside of the house to manually shift the bolt 152 to an unlocked position to open the door 149.

Figure 5A:
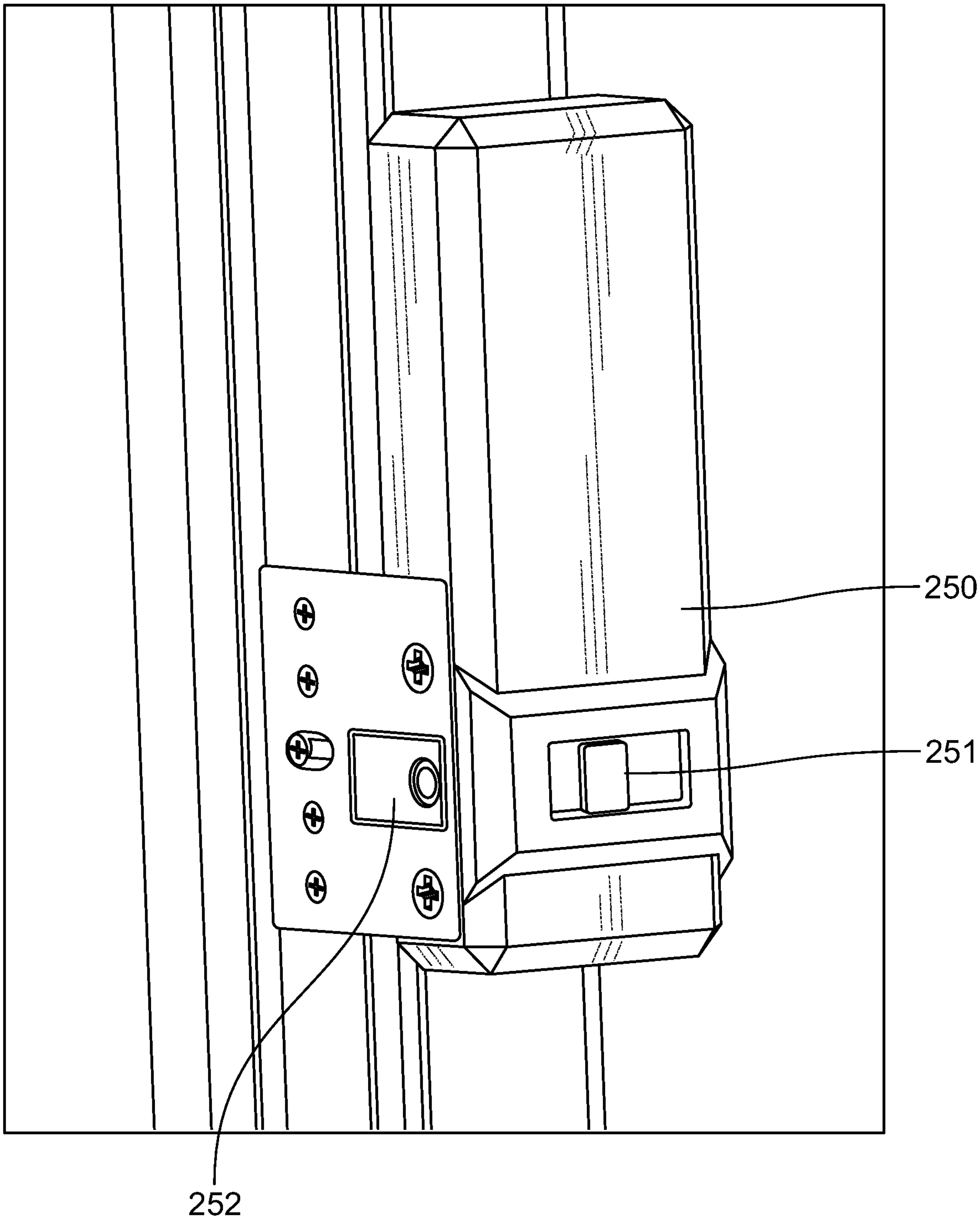
FIG. 5A is a perspective view of a passageway door lock.
Figure 5B:
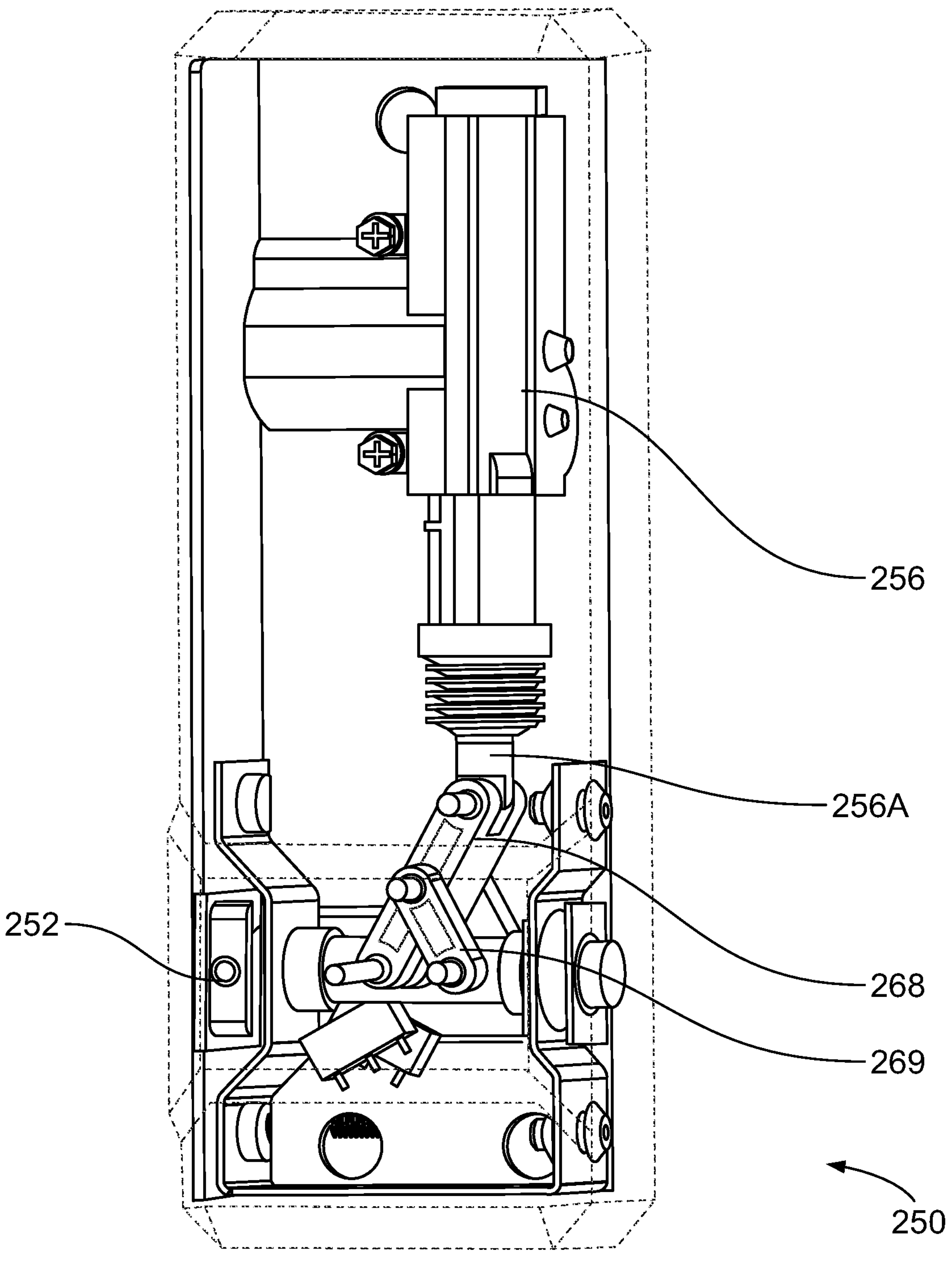
FIG. 5B is a perspective view of the lock of FIG. 5A with a housing of the lock transparent to show internal components of the lock.

Another lock 250 is illustrated in FIGS. 5A-5B. The lock 250 includes a linear actuator 256. The linear actuator 256 is operatively coupled to the bolt 252 by a linkage including links 268, 269. The links 268, 269 are pivotably connected such that they convert the vertical movement of a piston 256A of the actuator 256 into horizontal movement of the bolt 252. One end of the link 268 is coupled to the bolt 252, such that the vertical movement of the piston 256A actuates the bolt 252 between an extended locked position and a retracted unlocked position.

Figure 6:
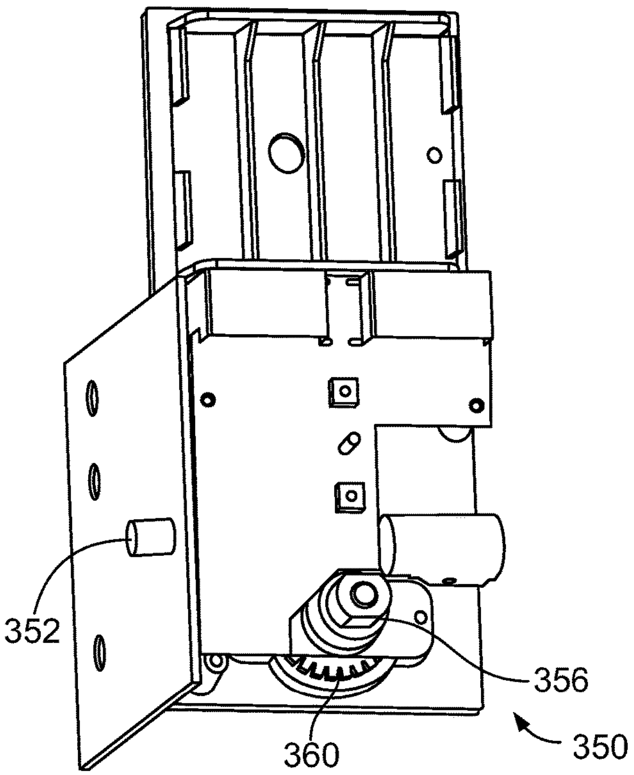
FIG. 6 is a perspective view of internal components of a passageway door lock.

The passageway door lock 350, as shown in FIG. 6, includes a motor 356 configured to rotate a slip clutch 360. The slip clutch 360 is operatively coupled to a bolt 352 such that rotation of the slip clutch 360 moves the bolt 352 between locked and unlocked positions. The bolt 352 has a cylindrical shape with rounded edges. The rounded shape of the bolt 352 decreases the likelihood of scratching the paint or finish of a door.

Figure 7:
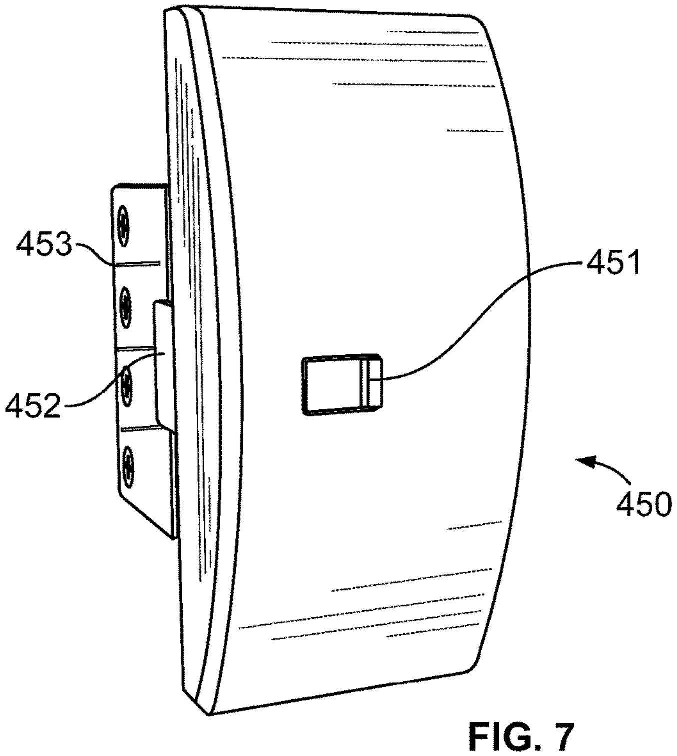
FIG. 7 is a perspective view of a passageway door lock.

FIG. 7 illustrates a passageway door lock 450 having a bolt 452 operatively coupled to a manual actuator 451. The lock 450 includes a slip clutch, such as the magnetic slip clutch 160 described above, allowing the bolt 452 to be manually actuated without damaging a drive motor of the lock 450. The lock 450 includes a mounting plate 453 having predetermined locations for receiving screws for mounting the lock 450 adjacent to a door.

Figure 8:
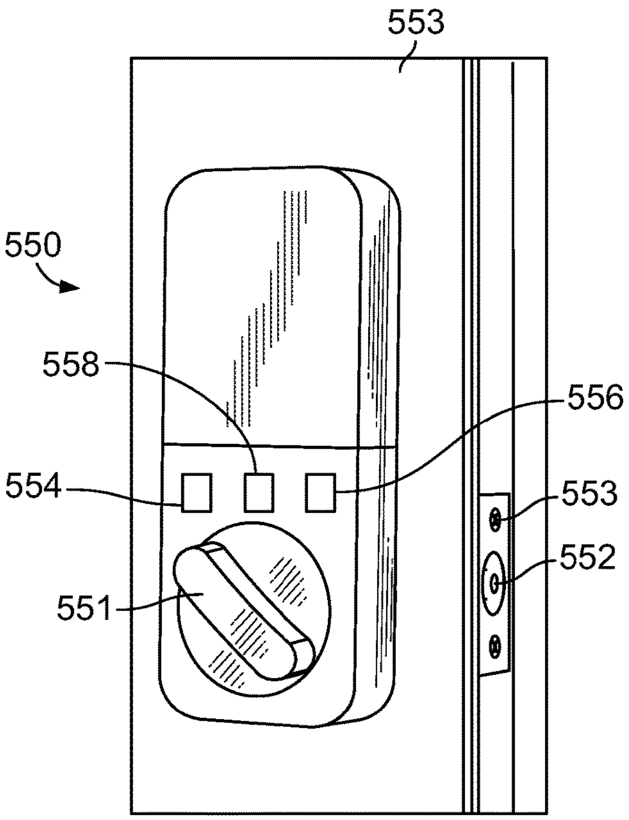
FIG. 8 is a perspective view of a passageway door lock of a passageway door with a bolt of the passageway door lock located within the door.

FIG. 8 illustrates a passageway door lock 550 of a door 553. As shown, the door lock 550 is configured to adapt or augment an existing deadbolt-type lock by coupling with or replacing a portion of the deadbolt-type lock, particularly an indoor mechanism. For instance, an indoor-accessible mechanism of a deadbolt lock such as a thumbturn or a keyed cylinder (of a double cylinder deadbolt) may be removed and replaced with the door lock 550 such that the remaining portions of the existing deadbolt lock (e.g., the keyed outdoor cylinder and the latch/bolt) couple and function with the door lock 550. Installation of the door lock 550 may entail replacement of a bolt 552, however the bolt 552 may be a portion of the existing deadbolt-type lock that remains independent of installation of the door lock 550. Bolt 552 is operatively coupled to a manual actuator 551 illustrated as a thumbturn. The bolt 552 is located within the door when in a retracted state. When actuated, the bolt 552 extends from the door and enters a cavity in the door frame, as in traditional deadbolt locks. The passageway door lock 550 includes a wireless communication circuit 554 for receiving signals to control the actuation of the bolt 552. When the wireless communication circuit 554 receives a signal, the signal is transmitted to a controller 558 which operates a motor 556 to move the bolt 552. The controller 558 may include a processor and a memory. The passageway door lock 550 further includes a power source, such as one or more batteries. The bolt 552 extends through an opening of a plate 553. Passageway door locks 150, 250, 350, 450, and 550 operate in a manner similar to the passageway door lock 50 and may be utilized in the system 100.

Figure 9:
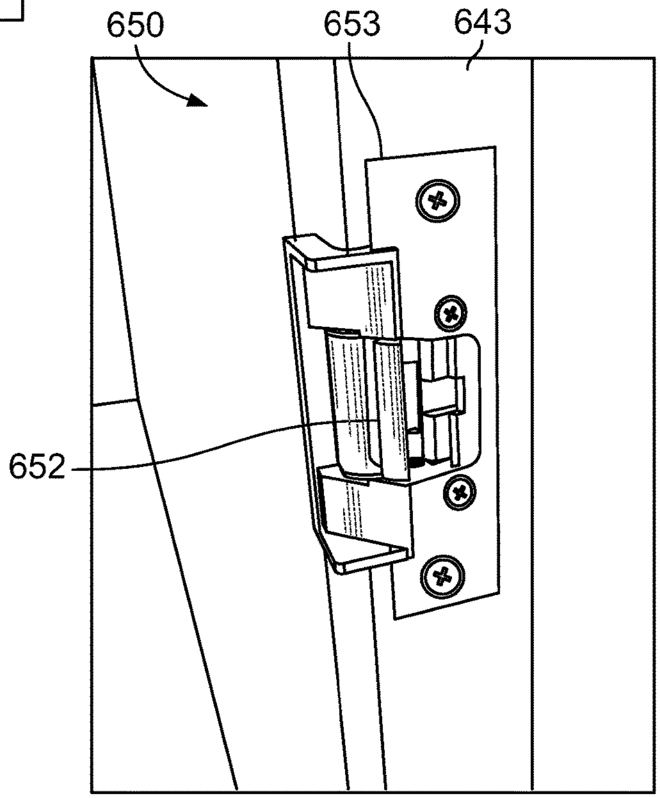
FIG. 9 is a perspective view of an electric strike for a passageway door.

In some forms, locks other than deadbolts may be used in the system 100 to secure the passageway door. FIG. 9 illustrates an electric strike 650 for securing a passageway door, such as the passageway door 49 of FIG. 1. The electric strike 650 includes a mounting plate or strike plate 653 for mounting the electric strike 650 to the door jamb 643. A movable keeper or latchbar 652 is configured to releasably secure the passageway door in a closed position. The latchbar 652 is actuated to move from the secured position, as shown in FIG. 9, to an unsecured position in order to release the passageway door. The electric strike contains an internal power source, motor or actuator, and wireless receiver similar to those described in the embodiments above.

As with the locks described above, the electric strike 650 is remotely controlled by at least one of the movable barrier operator 12 or a remote device, such as a server computer or a wireless device via the internet. In operation, a control signal is transmitted to the electric strike 650 which causes the electric strike 650 to move the latchbar 652 into the secured or unsecured position.

Other types of locks may be used in the system 100. For example, a lock that fits over a thumb turn of an existing, conventional deadbolt lock to operate the deadbolt may be utilized. As another example, a lock that replaces an interior-side thumb turn of a conventional deadbolt lock while keeping the internal deadbolt mechanism and exterior keyed cylinder may be utilized.

A user or administrator grants access to the garage 14 by giving out temporary or limited access codes. In some forms, the limited access code is in the form of a code to be entered into the keypad 34. In another form, the limited access code is programmed into a portable transmitter 30, 31 or the wireless device 61. In yet another form, the limited access code is programmed into the movable barrier operator 12 in addition to programming the limited access code (or a complementary code) into a portable transmitter 30, 31 or the wireless device 61. In other instances a remote resource 62 (e.g., server computer) transmits or otherwise communicates the limited access code to a portable transmitter 30, 31 or the wireless device 61 upon request after performance of a security measure such as at least one of verification, authorization and authentication of the requester. The wireless device 61 communicates with the remote resource 62, which may be a server computer or a plurality of server computers forming a cloud, which in turn communicates with the moveable barrier operator 12 via the local gateway 60. A limited access code may be one or more codes output from a rolling code encryption process used by the moveable barrier operator 12. Accordingly, the movable barrier operator 12 may provide the remote resource 62 with a rolling code that is generated or output based on a query or request such that the rolling code can be relayed to a portable transmitter 30, 31 or the wireless device 61 for example after performance of a security measure.

The moveable barrier operator 12 includes memory (e.g., integral/unitary or otherwise onboard the controller 13 in FIG. 3 or separate/distinct from the controller 13) storing the limited access codes and associating them with specific permissions. In some forms, the permissions limit the times of day and/or days during which the moveable barrier operator 12 will open the garage door 24 in response to receiving the limited access codes. The permissions also indicate whether or not the code grants access to the attached home or structure via the passageway door 49. The operation of the lock 50 and permission to open the door 49 can differ from whether a guest has permission to open the garage door 24. For example, some codes used to enter the garage door 24 can have stored permissions to permit entry into both the garage and the house, in which case the garage door 24 will open and the lock 50 will unlock. Other codes will have stored permissions limited to the garage, in which case the garage door 24 will open and the lock 50 will lock. In operation, a user having administrator rights may establish and/or provide access codes granting only garage access permission to delivery associates such that they can leave packages in the garage 14. Different access codes may be established and/or given to maids, contractors, guests, or others to control when such individuals are permitted to enter the garage 14 and whether the guest can open the door 49 to the adjacent area.

As described above, the moveable barrier operator 12 receives a signal and checks a code of the signal against a stored table of permissions. If the code grants permission to enter the garage 14 and the home, the movable barrier operator 12 or remote resource 62 transmits an unlock signal to the lock 50 at the passageway door 49 and the movable barrier operator 12 opens the garage door 22. If permission to enter the home is not granted but the guest can access the garage 14, the movable barrier operator 12 or remote resource 62 transmits a lock signal to the lock 50 and the movable barrier operator 12 opens the garage 14.

In addition to the limited access codes, the administrator or another user can create primary codes, such as permanent or resident access codes. The resident access codes can be used at any time and any number of times. When the moveable barrier operator 12 receives a resident access code, the movable barrier operator 12 transmits an unlock signal or causes remote resource 62 to transmit the unlock signal to the lock 50. These resident access codes can later be changed or revoked by the administrator.

The moveable barrier operator 12 may use additional data when determining whether or not to transmit a lock signal (or cause the lock signal to be transmitted e.g., from the remote resource 62) to the lock 50. In one example, the movable barrier operator 12 transmits a lock signal to the lock 50 if no users are at home, if only a single resident is at home, or if only children are at home, but not if adults are at home. The system 100 detects who is at home by, for example, tracking codes entered at the keypad 34, detecting vehicles in the garage 14, and/or identifying wireless devices communicatively coupled to the gateway 60 and/or the movable barrier operator 12. For example, the system 100 may store identifying information of the smartphones of the adults that live in the home. If those smartphones are connected to the gateway 60, they are identified by the movable barrier operator 12 and/or the remote resource 62, and the movable barrier operator 12 does not lock the passageway door lock 50. In alternative forms, the administrator or another user enters schedule information into an application running on her smartphone which is provided to a home automation system associated with the garage 14 and/or the movable barrier operator 12. The schedule information indicates the standard schedule of the users. The movable barrier operator 12 or the remote resource 62 will operate the lock 50 based on whether or not the adults should be home according to the preprogrammed schedule.

In some embodiments, the lock 50 includes one or more sensors configured to detect the position of the bolt 52. The position of the bolt 52 is transmitted to the moveable barrier operator 12 or the remote resource 62 by the lock 50. If the bolt 52 is already in the locked position, the movable barrier operator 12 or the remote resource 62 may not transmit a lock command. The sensor detects when the bolt 52 is actuated. In some forms, the moveable barrier operator 12 creates a log storing times at which the bolt 52 is actuated. This log can be accessed by the administrator or another user. Alternatively or additionally, a signal is transmitted to the wireless device 61 of the administrator when the bolt 52 is actuated. The moveable barrier operator 12 may store a log of received signals from transmitters 30, 31. The log includes identifying information associated with the transmitters 30, 31 and/or access codes and the time at which signals were received. In some forms, the log further includes the time at which a close signal was received at the moveable barrier operator 12 and/or the amount of time between the open and close signal.

In operation, each of the door locks 50-650 illustrated in FIGS. 2-9 and described above are controlled in substantially the same manner. A remote control transmits a control signal. The remote control may be a short range transmitter transmitting a signal directly to the movable barrier operator 12 or an internet connected wireless device sending a signal via the internet as some examples. The control signal is authenticated to determine if the remote control is associated with a first level of access or a second level of access. In response to the control signal being associated with a first level of access, the movable barrier operator 12 and passageway door lock 50-650 are operated to open and/or unlock the first barrier 24 and second barrier 49 respectively. In response to the control signal associated with a second level of access, the movable barrier operator 12 is operated to open the first barrier 24 and the passageway door lock 50-650 is operated to secure or lock the second barrier 49.

In some forms, the authentication is performed by the movable barrier operator 12. The movable barrier operator 12 receives the control signal transmitted by the remote control or receives a signal representing the control signal from an intermediate device, such as a server computer, and processes the received signal to determine the level of access. The moveable barrier operator 12 moves the first barrier 24 and transmits an actuation signal to the door lock 50-650 to lock or unlock based on the level of access associated with the signal as described above.

In alternative forms, a device separate from the movable barrier operator 12 authenticates the control signal. For example, an onsite communication hub or a remote server device authenticate the signal to determine the level of access. The authenticating device may then transmit an actuation signal to the movable barrier operator 12 and door lock 50-650 to operate the barriers 24, 49 as described above.

In still further forms, the movable barrier operator 12 authenticates the signal before moving the first barrier 12 and a separate device, such as the door lock 50-650, on site communication hub, or remote server device, separately authenticates the signal in order to determine the appropriate actuation of the door lock 50-650.

In some embodiments, additional devices, such as the indicator 19 or camera 17 are operated in response to the authentication of the signal. For example, the camera 17 is used to record data, such as images or video, in response to the control signal being a secondary signal (i.e., being associated with the second level of access) and/or the indicator 19 is operated to indicate a dropoff area in response to the control signal being a secondary signal.

Although method steps may be presented and described herein in a sequential fashion, one or more of the steps shown and described may be omitted, repeated, performed concurrently, and/or performed in a different order than the order shown in the figures and/or described herein. It will be appreciated that computer-readable instructions for facilitating the methods described above may be stored in various non-transitory computer readable mediums as is known in the art. Those skilled in the art will recognize that a wide variety of modifications, alterations, and combinations can be made with respect to the above described examples without departing from the scope of the invention, and that such modifications, alterations, and combinations are to be viewed as being within the ambit of the inventive concept.

What is claimed is:

1. A movable barrier operator comprising:

an actuator operable to secure and unsecure a first movable barrier;

communication circuitry configured to receive an access command from a remote control, the access command representative of a user input received at a user interface of the remote control requesting to access a first secured area associated with the first movable barrier, the access command including authentication data indicating whether the remote control is associated with a first level of access or a second level of access, the communication circuitry further configured to communicate with a second movable barrier operator associated with a second movable barrier of a second secured area; and a controller operatively coupled to the actuator and the communication circuitry, the controller configured to authenticate the access command based at least in part on the authentication data, wherein authentication of the access command includes determining an association of the access command with the first level of access or the second level of access;

wherein the controller is further configured to cause the communication circuitry to communicate a first actuation signal associated with the first level of access to the second movable barrier operator to cause the second movable barrier operator to unsecure the second movable barrier and permit access to the second secured area in response to determining that the access command is associated with the first level of access;

wherein the controller is further configured to cause the communication circuitry to communicate a second actuation signal associated with the second level of access to the second movable barrier operator to cause the second movable barrier operator to secure the second movable barrier and inhibit access to the second secured area in response to determining that the access command is associated with the second level of access; and wherein the controller is configured to cause the actuator to unsecure the first movable barrier upon the communication circuitry receiving the access command regardless of association of the access command with the first level of access or the second level of access.

2. The movable barrier operator of claim 1, wherein the authentication of the access command further includes determining whether the access command was received directly from the remote control or whether the access command was received from a remote server computer.

3. The movable barrier operator of claim 1, wherein the communication circuitry is further configured to communicate with a remote server computer to receive, from the remote server computer, an authentication signal indicating whether the access command is associated with the first level of access or the second level of access; and wherein the controller is configured to authenticate the access command based at least in part on the authentication signal received from the remote server computer.

4. The movable barrier operator of claim 1, further comprising a memory operatively coupled to the controller and configured to store information indicating whether the second movable barrier is secured or unsecured by the second movable barrier operator, wherein the controller is further configured to:

cause the communication circuitry to communicate the second actuation signal in response to the second movable barrier operator not securing the second movable barrier and the access command being associated with the second level of access; and not cause the communication circuitry to communicate the second actuation signal in response to the second movable barrier operator securing the second movable barrier and the access command being associated with the second level of access.

5. The movable barrier operator of claim 1, wherein the communication circuitry is configured to directly wirelessly communicate with the second movable barrier operator using one or a combination of wireless communication protocols including Bluetooth, Wi-Fi, ZigBee, and infrared.

6. The movable barrier operator of claim 1, wherein to unsecure the first movable barrier includes moving the first movable barrier from a closed position to an open position, wherein the controller is configured to cause the actuator to move the first movable barrier a first distance in response to the controller determining that the access command is associated with the first level of access, the controller further configured to cause the actuator to move the first movable barrier a second distance less than the first distance in response to the controller determining that the access command is associated with the second level of access.

7. The movable barrier operator of claim 1, further comprising a communication hub configured to communicate with the communication circuitry of the movable barrier operator and with the second movable barrier operator.

8. The movable barrier operator of claim 7, wherein the communication hub is configured to communicate with a remote server computer over a network.

9. The movable barrier operator of claim 7, wherein the communication hub is further configured to communicate a control signal to the communication circuitry in response to the authentication, the control signal configured to cause the controller to operate the actuator to unsecure the first movable barrier.

10. The movable barrier operator of claim 7, wherein the communication hub is further configured to communicate with a remote server computer to receive, from the remote server computer, an authentication signal indicating whether the access command is associated with the first level of access or the second level of access; and wherein the controller is configured to authenticate the access command based at least in part on the authentication signal received from the remote server computer.

11. The movable barrier operator of claim 1 wherein both the controller and the second movable barrier operator are configured to independently authenticate the access command.

12. The movable barrier operator of claim 1 wherein the controller is configured to cause the communication circuitry to wirelessly communicate the first actuation signal or the second actuation signal directly to the second movable barrier operator before causing the actuator to unsecure the first movable barrier.

13. The movable barrier operator of claim 1 wherein the actuator is operable to move the first movable barrier from a closed position to an open position to unsecure the first movable barrier.

14. The movable barrier operator of claim 1 in combination with the second movable barrier operator; and wherein the second movable barrier operator is a passageway door lock.

15. The movable barrier operator of claim 1 in combination with the second movable barrier operator;

wherein the second movable barrier operator comprises a locking member and a second actuator operable to shift the locking member from a locked position wherein the locking member inhibits opening of the second movable barrier to an unlocked position wherein the locking member permits opening of the second movable barrier; and wherein to secure the second movable barrier includes the second actuator shifting the locking member from the unlocked position to the locked position.

16. A method of controlling access to a first secured area secured by a first movable barrier and a second secured area secured by a second movable barrier, the method comprising:

at a first movable barrier operator associated with the first movable barrier:

receiving, via communication circuitry of the first movable barrier operator, an access command representative of a user input received at a user interface of a remote control requesting to unsecure the first movable barrier, the access command including authentication data that associates the access command with a first level of access or a second level of access;

authenticating the access command, at a controller of the first movable barrier operator, based at least in part on the authentication data, wherein authenticating includes determining an association of the access command with the first level of access or the second level of access;

selectively controlling a second movable barrier operator associated with the second movable barrier, wherein selectively controlling includes:

communicating a first actuation signal associated with the first level of access to the second movable barrier operator to cause the second movable barrier operator to unsecure the second movable barrier and permit access to the second secured area in response to determining that the access command is associated with the first level of access;

communicating a second actuation signal associated with the second level of access to the second movable barrier operator to cause the second movable barrier to secure the second movable barrier and inhibit access to the second secured area in response to determining that the access command is associated with the second level of access; and operating an actuator of the first movable barrier operator to unsecure the first movable barrier in response to determining that the access command is associated with either the first level of access or the second level of access.

17. The method of claim 16, wherein a communication hub is configured to communicate with the communication circuitry of the first movable barrier operator and with the second movable barrier operator.

18. The method of claim 17, further comprising communicating, via the communication hub, a control signal to the first movable barrier operator in response to the controller authenticating the access command, the control signal configured to cause the first movable barrier operator to operate the actuator to unsecure the first movable barrier.

19. The method of claim 16, wherein authenticating the access command includes determining whether the access command was received directly from a remote control or whether the access command was received from a remote server computer.

20. The method of claim 16, further comprising receiving, at the communication circuitry, an authentication signal from a remote server computer indicative of the access command being associated with the first level of access or the second level of access; and wherein authenticating the access command is further based at least in part on receipt of the authentication signal.

21. The method of claim 16, wherein communicating the first actuation signal or the second actuation signal to the second movable barrier operator includes communicating the first actuation signal or the second actuation signal using Bluetooth, Wi-Fi, ZigBee, infrared, or a combination thereof.

22. The method of claim 16, further comprising:

authenticating, at a controller of the second movable barrier operator, the access command based at least in part on the authentication data.

23. The method of claim 16 wherein operating the actuator of the first movable barrier operator to unsecure the first movable barrier is performed upon communicating the first actuation signal or second actuation signal to the second movable barrier operator.

24. The method of claim 16 wherein operating the actuator of the first movable barrier operator to unsecure the first movable barrier includes moving the first movable barrier to an open position.

25. The method of claim 16 wherein to cause the second movable barrier operator to unsecure the second movable barrier includes unlocking a lock that inhibits movement of the second movable barrier; and wherein to cause the second movable barrier operator to secure the second movable barrier includes locking the lock.

26. The method of claim 16 wherein the first movable barrier is a garage door and the second movable barrier is a passageway door.

27. A non-transitory computer readable medium storing instructions for controlling access to a first secured area secured by a first movable barrier and a second secured area secured by a second movable barrier, the instructions when executed by one or more processors cause the one or more processors to perform operations comprising:

receiving, via communication circuitry of a first movable barrier operator associated with the first movable barrier, an access command representative of a user input received at a user interface of a remote control requesting to unsecure the first movable barrier, the access command including authentication data that associates the access command with a first level of access or a second level of access;

authenticating the access command based at least in part on the authentication data, wherein authenticating includes determining an association of the access command with the first level of access or the second level of access;

selectively controlling a second movable barrier operator associated with the second movable barrier, wherein selectively controlling includes:

communicating a first actuation signal associated with the first level of access to the second movable barrier operator to cause the second movable barrier operator to unsecure the second movable barrier and permit access to the second secured area in response to determining that the access command is associated with the first level of access;

communicating a second actuation signal associated with the second level of access to the second movable barrier operator to cause the second movable barrier to secure the second movable barrier and inhibit access to the second secured area in response to determining that the access command is associated with the second level of access; and operating an actuator of the first movable barrier operator to unsecure the first movable barrier in response to determining that the access command is associated with either the first level of access or the second level of access.

28. The non-transitory computer readable medium according to claim 27, the operations further comprising receiving, at the communication circuitry of the first movable barrier operator, an authentication signal from a remote server computer indicative of the access command being associated with the first level of access or the second level of access; and wherein authenticating the access command is further based at least in part on receipt of the authentication signal.

29. The non-transitory computer readable medium according to claim 27 wherein to cause the second movable barrier operator to unsecure the second movable barrier includes unlocking a lock that inhibits movement of the second movable barrier; and wherein to cause the second movable barrier operator to secure the second movable barrier includes locking the lock.

* * * * *